(12) United States Patent
Lewis et al.

(10) Patent No.: US 12,460,119 B2
(45) Date of Patent: Nov. 4, 2025

(54) WELL BARRIERS FOR SUBTERRANEAN STORAGE OF CARBON DIOXIDE

(71) Applicant: Halliburton Energy Services, Inc., Houston, TX (US)

(72) Inventors: Samuel J. Lewis, Houston, TX (US); Paul J. Jones, Houston, TX (US)

(73) Assignee: Halliburton Energy Services, Houston, TX (US)

( * ) Notice: Subject to any disclaimer, the term of this patent is extended or adjusted under 35 U.S.C. 154(b) by 0 days.

(21) Appl. No.: 18/603,615

(22) Filed: Mar. 13, 2024

(65) Prior Publication Data

US 2024/0218231 A1  Jul. 4, 2024

Related U.S. Application Data

(63) Continuation of application No. 17/898,978, filed on Aug. 30, 2022, now Pat. No. 12,065,610.

(51) Int. Cl.
| | |
|---|---|
| *E21B 33/13* | (2006.01) |
| *C04B 24/28* | (2006.01) |
| *C04B 28/02* | (2006.01) |
| *C09K 8/467* | (2006.01) |
| *E21B 33/14* | (2006.01) |
| *C04B 103/00* | (2006.01) |

(Continued)

(52) U.S. Cl.
CPC ............ *C09K 8/467* (2013.01); *C04B 24/281* (2013.01); *C04B 28/02* (2013.01); *E21B 33/13* (2013.01); *E21B 33/14* (2013.01); *C04B 2103/0036* (2013.01); *C04B 2103/14* (2013.01); *C04B 2111/22* (2013.01)

(58) Field of Classification Search
None
See application file for complete search history.

(56) References Cited

U.S. PATENT DOCUMENTS

| | | |
|---|---|---|
| 6,244,344 B1 | 6/2001 | Chatterji et al. |
| 6,330,917 B2 | 12/2001 | Chatterji et al. |
| 9,896,269 B2 | 2/2018 | Williams et al. |

(Continued)

FOREIGN PATENT DOCUMENTS

| | | |
|---|---|---|
| WO | 2016118146 | 7/2016 |
| WO | 2021236161 | 11/2021 |

OTHER PUBLICATIONS

Baldissera, Alessandra F.; Schütz, Marta K.; Vecchia, Felipe D.; Seferin, Marcus; Ligabue, Rosane; Menezes, Sonia C.; Einloft, Sandra (2017). Epoxy-modified Portland Cement: Effect of the Resin Hardener on the Chemical Degradation by Carbon Dioxide. Energy Procedia, 114(), 5256-5265.

(Continued)

*Primary Examiner* — Andrew Sue-Ako
(74) *Attorney, Agent, or Firm* — Thomas Rooney; C. Tumey Law Group, PLLC

(57) ABSTRACT

A method may include: introducing a resin modified cement slurry into a wellbore penetrating a subterranean formation, the subterranean formation comprising a caprock and a carbon dioxide injection zone, the resin modified cement slurry comprising: a resin; a hardener, a hydraulic cement; and water; and setting the resin modified cement slurry to form a set cement wherein the set cement forms a carbonation-resistant barrier in the carbon dioxide injection zone in the subterranean formation.

20 Claims, 10 Drawing Sheets

(51) Int. Cl.
*C04B 103/14* (2006.01)
*C04B 111/22* (2006.01)

(56) References Cited

U.S. PATENT DOCUMENTS

| | | | |
|---|---|---|---|
| 10,253,240 B2 | 4/2019 | Jones et al. | |
| 10,533,123 B2 | 1/2020 | Kulkarni et al. | |
| 2005/0092492 A1 | 5/2005 | Bossaerts et al. | |
| 2010/0025039 A1* | 2/2010 | Roddy | C04B 14/104 |
| | | | 423/328.1 |
| 2011/0013986 A1 | 1/2011 | Zebrowski | |
| 2011/0187556 A1* | 8/2011 | Roddy | G01V 15/00 |
| | | | 340/853.3 |
| 2012/0328377 A1* | 12/2012 | Brenneis | C04B 26/12 |
| | | | 523/130 |
| 2013/0109782 A1 | 5/2013 | Ladva et al. | |
| 2013/0220612 A1 | 8/2013 | Karcher et al. | |
| 2016/0348464 A1 | 12/2016 | Sabins et al. | |
| 2017/0335168 A1* | 11/2017 | Kulkarni | C09K 8/467 |
| 2017/0369761 A1* | 12/2017 | Jones | C04B 24/281 |
| 2021/0363401 A1 | 11/2021 | Jones et al. | |

OTHER PUBLICATIONS

International Search Report and Written Opinion for International Patent Application No. PCT/US2022/044746 dated May 23, 2023.
Baldissera, A. F. et al., "Epoxy resin-cement paste composite for wellbores: Evaluation of chemical degradation fostered carbon dioxide", Greenhouse gases: science and technology, Jul. 2017.
Office Action Summary for U.S. Appl. No. 17/898,978 dated Jul. 25, 2023.
Notice of Allowance for U.S. Appl. No. 17/898,978 dated Feb. 12, 2024.
Final Office Action Summary for U.S. Appl. No. 17/898,978 dated Nov. 14, 2023.

* cited by examiner

WELL BARRIERS FOR SUBTERRANEAN STORAGE OF CARBON DIOXIDE

CROSS-REFERENCE TO RELATED APPLICATIONS

This is a continuation of U.S. application Ser. No. 17/898,978, filed Aug. 30, 2022, which is a nonprovisional application claiming, the entire disclosure of which is incorporated herein by reference.

BACKGROUND

Methods of constructing and remediating carbon capture underground storage (CCUS) wells utilize Portland cement compositions that include Portland cement and water. CCUS well barriers constructed using Portland cement compositions may be subjected over time to degradation, increased porosity, and reduced mechanical strength and barrier integrity from prolonged contact with carbon dioxide.

BRIEF DESCRIPTION OF THE DRAWINGS

These drawings illustrate certain aspects of some of the embodiments of the present disclosure and should not be used to limit or define the disclosure.

DETAILED DESCRIPTION

Figure 1:
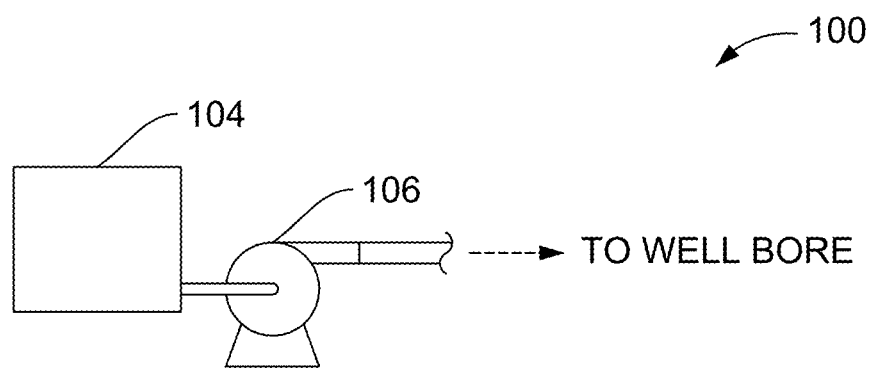
FIG. 1 illustrates a system for the preparation and delivery of a resin modified cement slurry to a wellbore in accordance with certain embodiments.

The present disclosure relates to systems and methods of cementing carbon capture underground storage (CCUS) wells and methods of using carbon capture underground storage well barriers to store carbon dioxide. More particularly, certain embodiments of the present disclosure are directed to systems and methods of using a resin modified cement slurry comprising a hydraulic cement, a resin, a hardener, and water, in construction and remediation of subterranean and subsea carbon capture underground storage wells to mitigate carbonation of cement therein.

In some examples, the hydraulic cement may include a Portland cement. In some examples, the Portland cements may include Portland cements that are classified as Class A, B, C, D, E, F, G, H, K and L cements according to American Petroleum Institute, API Specification for Materials and Testing for Well Cements, API Specification 10A, Twenty-Fifth Ed., March 2019. In some examples, resin modified cement slurries may include cements classified by American Society for Testing and Materials (ASTM) in C150 (Standard Specification for Portland Cement), C595 (Standard Specification for Blended Resin modified cement slurry) or C1157 (Performance Specification for Resin modified cement slurries) such as those cements classified as ASTM Type I, II, or III. Cementitious materials may be combined with the aqueous base fluids to form a cement slurry which may be introduced into a wellbore penetrating a subterranean formation. The cement may be included in the resin modified cement slurry in any suitable amount, including, but not limited to, about 20% to about 99% by weight of the resin modified cement slurry. Alternatively, the cement may be included in the resin modified cement slurry in a range of about 50% to about 75% by weight, about 55% to about 75% by weight, about 60% to about 70% by weight, about 60% to about 75% by weight, about 45% to about 80% by weight. Suitable amounts may include, but are not limited to, 20%, 30%, 40%, 50%, 60%, 70%, 80%, 90%, or 99% by weight of the resin modified cement slurry.

As used herein, the term "resin" may refer to any of a number of physically similar polymerized synthetics or chemically modified natural resins including thermoplastic materials and thermosetting materials. In some examples, resins may be liquid curable resins which may include, but are not limited to, epoxy-based resins, cyclic olefins, novolak resins, polyepoxide resins, phenol-aldehyde resins, urea-aldehyde resins, urethane resins, phenolic resins, furan resins, furan and furfuryl alcohol resins, phenolic/latex resins, phenol formaldehyde resins, bisphenol A diglycidyl ether resins, butoxymethyl butyl glycidyl ether resins, bisphenol A-epichlorohydrin resins, bisphenol F resins, diglycidyl ether bisphenol F resin, cyclohexane dimethanol diglycidyl ether, glycidyl ether resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped downhole, they may be cured using only time and temperature. Other suitable resins, such as furan resins generally require a time-delayed catalyst or an external catalyst to help activate the polymerization of the resins if the cure temperature is low (i.e., less than 250° F. (121° C.), but will cure under the effect of time and temperature if the formation temperature is above about 250° F.

Selection of a particular resin may be affected by the temperature of the subterranean formation to which the resin modified cement slurry will be introduced. By way of example, for subterranean formations having a bottom hole static temperature ("BHST") ranging from about 60° F. (15.5° C.) to about 400° F. (204° C.), two-component resins may be used. Generally, a resin may be included in the resin modified cement slurry in an amount in a range of from about 2% to about 60% by volume of the resin modified cement slurry. Alternatively, a resin may be included in the resin modified cement slurry in an amount in a range of from about 1% to about 60% by weight of the resin modified cement slurry. Alternatively, from about 1% to about 5% by weight, from about 1% to about 10% by weight, from about 1% to about 15% by weight, from about 1% to about 25% by weight, from about 1% to about 35% by weight, from about 1% to about 45% by weight, from about 1% to about 55% by weight, from about 5% to about 10% by weight, from about 5% to about 15% by weight, from about 5% to about 20% by weight, from about 15% to about 30% by weight, from about 30% to about 45% by weight, from about 45% to about 60% by weight, or any ranges therebetween.

As used herein, the term "hardener" or "hardening agent" may refer to any substance capable of transforming a resin into a hardened, consolidated mass. Examples of suitable hardening agents may include, but are not limited to, aliphatic amines, aliphatic tertiary amines, aromatic amines, transition metal catalysts, cycloaliphatic amines, heterocyclic amines, amido amines, polyamides, polyethyl amines, polyether amines, polyoxyalkylene amines, carboxylic anhydrides, triethylenetetraamine, ethylene diamine, N-cocoalkyltrimethylene, isophorone diamine, N-aminophenyl piperazine, imidazoline, 1,2-diaminocyclohexane, polyetheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and combinations thereof. Examples of commercially available hardening agents may include, but are not limited to, combinations of hardeners such as 75%-81% 3,5-diethyltoluene-2,4-diamine, 18%-20% 3,5-diethyltoluene-2,6-diamine, and 0.5%-3% dialkylated phenylenediamines. In some embodiments the hardening agent may comprise a mixture of hardening agents selected to impart particular qualities to the resin modified cement slurry. In some embodiments, the hardening agents may be included in the resin modified cement slurry at a point in a range of from about 0.05% to about 50% by volume of the resin modified cement slurry. Alternatively, from about 1% to about 10% by volume, from about 1% to about 5% by volume, about 10% to about 20% by volume, about 20% to about 30% by volume, about 4% to about 50% by volume, or any ranges therebetween. Alternatively, from about 0.05% to about 5% by weight of the slurry, 0.05% to about 10% by weight of the slurry, from about 0.05% to about 15% by weight of the slurry, about 10% to about 20% by weight of the slurry, about 20% to about 30% by weight of the slurry, about 4% to about 50% by weight of the slurry, or any ranges therebetween. In some embodiments, the resin modified cement slurry may be free of polyamine.

Resin modified cement slurries may include a resin that can undergo a ring-opening metathesis polymerization (ROMP) reaction. Resin molecules that undergo ROMP may polymerize by forming new carbon-carbon bonds between molecules. Once the polymerization reaction is initiated, the reaction may proceed rapidly to transform the resin modified cement slurry from a liquid to a solid. During the reaction, heat may be released, which may raise the temperature of the resin modified cement slurry, however, the heat generated may not be sufficient to char or degrade the final hardened mass. The resin in the resin modified cement slurry may be pumpable below 38° C. (100° F.) without additional solvents present. Further, the resin may have a density greater than water and a viscosity that may be ideal for deep penetration into channels and efficient squeezes for defects such as gas migration or casing leaks.

A resin included in the resin modified cement slurry may include a cycloalkene, which may be a cycloalkadiene, that may undergo a ring-opening metathesis polymerization reaction transforming the resin modified cement slurry into a hardened mass. The cycloalkene may have no aromatic character. The cycloalkene may include, but is not limited to, cyclopentadiene, dicyclopentadiene, tricyclopentadiene, cyclobutadiene, cyclohexadiene, terpinene, norbornadiene, isomers thereof, and combinations thereof. The cycloalkene may also be substituted or unsubstituted cycloalkadienes. Substituted cycloalkadienes may be substituted with a hydrocarbyl group or any other suitable organic functional group.

A resin included in the resin modified cement slurry may include an olefin. The olefin may comprise a cyclic olefin. The cyclic olefin may be present in the resin modified cement slurry in any suitable amount, including but not limited to a range of about 1% to about 60% by weight of the resin modified cement slurry. Alternatively, the cyclic olefin may be present in a range of about 1% to about 10% by weight, about 1% to about 15% by weight, about 1% to about 20% by weight, 1% to about 25% by weight, about 5% to about 20% by weight, about 20% to about 30% by weight, about 30% to about 40% by weight, about 40% to about 50% by weight, about 50% to about 60% by weight.

In some embodiments, the hardener may comprise a transition metal catalyst. The transition metal catalyst may be present in the resin modified cement slurry in any suitable amount, including but not limited to a range of about 0.0001% to about 5% by weight of the resin modified cement slurry. Alternatively, the transition metal catalyst may be present in a range of about 0.0001% to 0.001% by weight, about 0.001% to about 0.01% by weight, about 0.01% to about 0.1% by weight, about 0.1% by weight to about 1% by weight, about 1% to about 2% by weight, about 2% to about 3% by weight, about 3% to about 4% by weight, about 4% to about 5% by weight. Alternatively, the transition metal catalyst may be present in a range of about 0.0001% to 0.001% by volume, about 0.001% to about 0.01% by volume, about 0.01% to about 0.1% by volume, about 0.1% by weight to about 1% by volume, about 1% to about 2% by volume, about 2% to about 3% by volume, about 3% to about 4% by volume, about 4% to about 5% by volume. Alternatively, the transition metal catalyst may be present in an amount less than 10% by weight, less than 20% by weight, less than 30% by weight, less than 40% by weight, or less than 50% by weight.

In embodiments wherein the hardener comprises a transition metal catalyst, the transition metal catalyst may comprise a transition metal compound catalyst which may include a substituted or unsubstituted metal carbene compound comprising a transition metal and an organic backbone. Some non-limiting examples of the transition metal compound catalyst may include, but not are limited to a Grubbs Catalyst® and Schrock catalysts. The Grubbs Catalyst® may include ruthenium alkylidene or osmium alkylidene and Schrock catalyst may include molybdenum. Selection of a transition metal compound catalyst may affect a polymerization rate of the resin in the resin modified cement slurry. The transition metal compound catalyst may be present in the resin modified cement slurry at a point in a range of about 0.0001 wt. % to about 20 wt. %. Alternatively, the transition metal compound catalyst may be present at a point in a range of about 0.0001 wt. % to about 0.001 wt. %, at a point in a range of about 0.001 wt. % to about 0.01 wt. %, at a point in a range of about 0.01 wt. % to about 0.1 wt. %, at a point in a range of about 0.1 wt. % to about 1 wt. %, at a point in a range of about 1 wt. % to about 5 wt. %, at a point in a range of about 5 wt. % to about 10 wt. %, at a point in a range of about 10 wt. % to about 15 wt. %, at a point in a range of about 15 wt. % to about 20 wt. %, or any ranges therebetween. Alternatively, the resin and the transition metal compound catalyst concentrations may be expressed as relative mass ratios. For example, the resin and the transition metal compound catalyst may be present in the resin modified cement slurry in a mass ratio of about 50:1 to about 10000:1 resin to transition metal compound catalyst. Alternatively, the resin and transition metal compound catalyst may also be present in mass ratios of about 50:1 to about 100:1, about 100:1 to about 500:1, about 500:1 to about 1000:1, about 1000:1 to about 2000:1, about to 2000:1 to about 3000:1, about 3000:1 to about 4000:1, about 4000:1 to about 5000:1, about 5000:1 to about 6000:1, about 6000:1 to about 7000:1, about 7000:1 to about 8000:1, about 8000:1 to about 9000:1, about 9000:1 to about 10000:1 or any mass ratios therebetween of the resin to the transition metal compound catalyst. Alternatively, the transition metal compound catalyst may be suspended in a mineral oil suspension, or any suitable suspension medium. For example, the suspension medium may be present in the transition metal compound catalyst suspension in an amount of about 90% to 99% of the transition metal compound catalyst suspension. Alternatively, the suspension medium may be present in amount of about 90% to about 92%, about 93% to about 95%, and about 96% to about 99%. The resin and the transition metal compound catalyst suspension concentrations may be expressed as relative mass ratios. For example, the resin and the transition metal compound catalyst suspension may be present in the resin modified cement slurry in a mass ratio of about 50:1 resin to transition metal compound catalyst suspension. Alternatively, the resin and transition metal compound catalyst suspension may also be present in mass ratios of about 20:1, about 30:1, about 40:1, about 60:1, about 70:1, or about 80:1, or any mass ratios therebetween of the resin to the transition metal compound catalyst suspension. Specific examples of suitable transition metal compound catalysts will be described in detail below.

The transition metal compound catalyst may have the general chemical structure depicted in Structure 1. M may be either ruthenium or osmium. R and R1 may be independently selected from hydrogen, C2-C20 alkenyl, C2-C20 alkynyl, C2-C20 alkyl, aryl, C1-C20 carboxylate, C1-C20 alkoxy, C2-C20 alkenyloxy, C2-C20 alkynyloxy, aryloxy, C2-C20 alkoxycarbonyl, C1-C20 alkylthio, C1-C20 alkylsulfonyl or C1-C20 alkyl sulfinyl. The selected R and R1 may be optionally substituted with C1-C5 alkyl, halogen, C1-C5 alkoxy or with a phenyl group further optionally substituted with halogen, C1-C5 alkyl or C1-C5 alkoxy. X and X1 may be the same or different and may be any suitable anionic ligand. L and L1 may any suitable neutral electron donor.

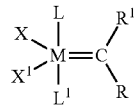

Structure 1

The transition metal compound catalyst may also have the general chemical structure depicted in Structure 2. M may be either ruthenium or osmium. R and R1 may be independently selected from hydrogen, C2-C20 alkenyl, C2-C20 alkynyl, C2-C20 alkyl, aryl, C1-C20 carboxylate, C1-C20 alkoxy, C2-C20 alkenyloxy, C2-C20 alkynyloxy, aryloxy, C2-C20 alkoxycarbonyl, C1-C20 alkylthio, C1-C20 alkylsulfonyl or C1-C20 alkyl sulfinyl. The selected R and R1 may optionally be substituted with C1-C5 alkyl, halogen, C1-C5 alkoxy or with a phenyl group further optionally substituted with halogen, C1-C5 alkyl or C1-C5 alkoxy. X and X1 groups may be the same or different and may be any suitable anionic ligand. L2, L3, and L4 may be the same or different, and may be any suitable neutral electron donor ligand, wherein at least one L2, L3, and LA may be an N-heterocyclic (NHC) carbene ligand as described below.

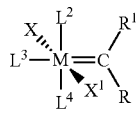

Structure 2

The transition metal compound catalyst may also have the general chemical structure depicted in Structure 3. M may be either ruthenium or osmium. R and R1 may be independently selected from hydrogen, C2-C20 alkenyl, C2-C20 alkynyl, C2-C20 alkyl, aryl, C1-C20 carboxylate, C1-C20 alkoxy, C2-C20 alkenyloxy, C2-C20 alkynyloxy, aryloxy, C2-C20 alkoxycarbonyl, C1-C20 alkylthio, C1-C20 alkylsulfonyl or C1-C20 alkyl sulfinyl. The selected R and R1 may optionally be substituted with C1-C5 alkyl, halogen, C1-C5 alkoxy or with a phenyl group further optionally substituted with halogen, C1-C5 alkyl or C1-C5 alkoxy. X and X1 may be the same or different and may be any suitable anionic ligand. NHC may be any N-heterocyclic carbene (NHC) ligand as described below.

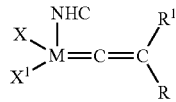

Structure 3

The transition metal compound catalyst may also have the general chemical structure depicted in Structure 4. M may be either ruthenium or osmium. R and R1 may be independently selected from hydrogen, C2-C20 alkenyl, C2-C20 alkynyl, C2-C20 alkyl, aryl, C1-C20 carboxylate, C1-C20 alkoxy, C2-C20 alkenyloxy, C2-C20 alkynyloxy, aryloxy, C2-C20 alkoxycarbonyl, C1-C20 alkylthio, C1-C20 alkylsulfonyl or C1-C20 alkyl sulfinyl. The selected R and R1 may optionally be substituted with C1-C5 alkyl, halogen, C1-C5 alkoxy or with a phenyl group further optionally substituted with halogen, C1-C5 alkyl or C1-C5 alkoxy. X and X1 may be the same or different and may be any suitable anionic ligand. NHC may be any N-heterocyclic carbene (NHC) ligand as described below.

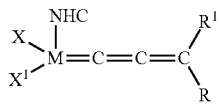

Structure 4

The transition metal compound catalysts of Structures 2-4 may further include an N-heterocyclic carbene (NHC) ligand. The NHC ligands may include 4-membered NHC and 5-membered NHC where the NHC ligand may attach to one coordination site of the transition metal compound catalyst. Structures 5-9 are exemplary structures of NHC ligands.

The NHC ligand may be a 4-membered N-heterocyclic carbene ligand. An exemplary structure of 4-membered carbene ligand is depicted in Structure 5. In the following structure, iPr is an isopropyl group.

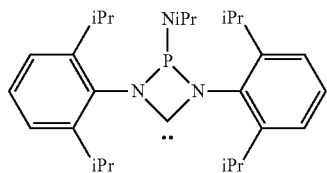

Structure 5

The NHC ligand may also be a 5-membered N-heterocyclic carbene ligand. An exemplary structure of 5-membered carbene ligands is depicted in Structure 6 and Structure 7. R' and R2 may be independently selected from 2,4,6-(Me)3C6H2, 2,6-(iPr)2C6H3, cyclohexyl, tert-butyl, 1-adamantyl.

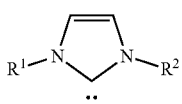

Structure 6

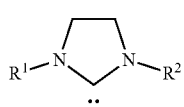

Structure 7

The NHC ligand may be a 5-membered N-heterocyclic carbene ligand. Another exemplary structure of a 5-membered carbene ligand is depicted in Structure 8. R1 and R2 may be equivalent groups and may be selected from $(CH_2)_n$ where n may be 4-7 and 12.

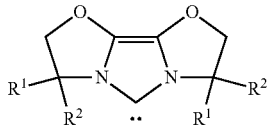

Structure 8

The NHC ligand may be a 5-membered N-heterocyclic carbene ligand. An exemplary structure of 5-membered carbene ligand is depicted in Structure 9. R may be selected between hydrogen and tert-butyl.

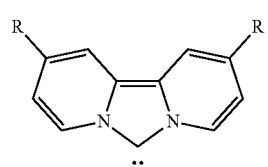

Structure 9

In embodiments, the resin and hardener together may be present in the resin modified cement slurry in an amount of 40% by volume to 99% by volume. Alternatively, from about 40% by volume to 50% by volume, from about 50% by volume to 60% by volume, from about 60% by volume to 70% by volume, from about 70% by volume to 80% by volume, from about 80% by volume to 90% by volume, from about 90% by volume to 99% by volume, or any ranges therebetween. In embodiments, the resin and hardener together may be present in the resin modified cement slurry in an amount of at least 40% by volume of the resin modified cement slurry. Alternatively, in an amount of at least 50% by volume of the resin modified cement slurry, in an amount of at least 60% by volume of the resin modified cement slurry, in an amount of at least 70% by volume of the resin modified cement slurry, in an amount of at least 80% by volume of the resin modified cement slurry, in an amount of at least 90% by volume of the resin modified cement slurry, or in an amount of at least 99% by volume of the resin modified cement slurry.

In some embodiments, the resin modified cement slurry may be free of epoxy phenol novolak resins. In some embodiments, the resin modified cement slurry may be free of bisphenol A diglycidyl ether resins. In some embodiments, the resin modified cement slurry may be free of napthol-based epoxy resins. In some embodiments, the resin modified cement slurry may be free of naphthalene. In some embodiments, the resin modified cement slurry may be free of epoxy-based resins. In some embodiments, the resin modified cement slurry may be free of bisphenol. In some embodiments, the resin modified cement slurry may be free of novolak resins.

The water may be from any source provided that it does not contain an excess of compounds that may undesirably affect other components in the resin modified cement slurries. For example, a resin modified cement slurry may include fresh water or saltwater. Saltwater generally may include one or more dissolved salts therein and may be saturated or unsaturated as desired for a particular application. Seawater or brines may be suitable for use in some examples. Further, the water may be present in an amount sufficient to form a pumpable slurry. In certain examples, the water may be present in the resin modified cement slurry in an amount in the range from about 33% to about 200% by weight of the cementitious materials. For example, the water may be present in an amount ranging between any of and/or including any of about 33%, about 50%, about 75%, about 100%, about 125%, about 150%, about 175%, or about 200% by weight of the hydraulic cement or by weight of a dry blend of cementitious materials. The cementitious materials referenced may include all components which contribute to the compressive strength of the resin modified cement slurry such as the hydraulic cement, resin, and supplementary cementitious materials, for example.

The supplementary cementitious material may be any material that contributes to the compressive strength of the resin modified cement slurry. Some supplementary cementitious materials may include, without limitation, fly ash, blast furnace slag, natural glass, shale, or metakaolin, silica fume, pozzolans, kiln dust, and clays, Portland cements, pozzolana cements, gypsum cements, high alumina content cements, slag cements, high magnesia content cements, shale cements, acid/base cements, fly ash cements, zeolite cement systems, kiln dust cement systems, microfine cements, metakaolin cements, pumice/lime cements, silica cements, and any combination thereof.

"Fly ash" may be of any grade including those classified as Class C, Class F, or Class N fly ash according to American Petroleum Institute, API Specification for Materials and Testing for Well Cements, API Specification 10, Fifth Ed., Jul. 1, 1990.

"Kiln dust," as that term is used herein, refers to a solid material generated as a by-product of the heating of certain materials in kilns. The term "kiln dust" as used herein is intended to include kiln dust made as described herein and equivalent forms of kiln dust. Depending on its source, kiln dust may exhibit cementitious properties in that it can set and harden in the presence of water. Examples of suitable kiln dusts include cement kiln dust, lime kiln dust, and combinations thereof. Cement kiln dust may be generated as a by-product of cement production that is removed from the gas stream and collected, for example, in a dust collector. Usually, large quantities of cement kiln dust are collected in the production of cement that are commonly disposed of as waste. The chemical analysis of the cement kiln dust from various cement manufactures varies depending on a number of factors, including the particular kiln feed, the efficiencies of the cement production operation, and the associated dust collection systems. Cement kiln dust generally may include a variety of oxides, such as $SiO_2$, $Al_2O_3$, $Fe_2O_3$, CaO, MgO, $SO_3$, $Na_2O$, and $K_2O$. The chemical analysis of lime kiln dust from various lime manufacturers varies depending on several factors, including the particular limestone or dolomitic limestone feed, the type of kiln, the mode of operation of the kiln, the efficiencies of the lime production operation, and the associated dust collection systems. Lime kiln dust generally may include varying amounts of free lime and free magnesium, limestone, and/or dolomitic limestone and a variety of oxides, such as $SiO_2$, $Al_2O_3$, $Fe_2O_3$, CaO, MgO, $SO_3$, $Na_2O$, and $K_2O$, and other components, such as chlorides. Cement kiln dust may include a partially calcined kiln feed which is removed from the gas stream and collected in a dust collector during the manufacture of cement. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, CaO, MgO, $SO_3$, $Na_2O$, and $K_2O$. The CKD and/or lime kiln dust may be included in examples of the resin modified cement slurry in an amount suitable for a particular application.

Slag is generally a granulated, blast furnace by-product from the production of cast iron including the oxidized impurities found in iron ore. The resin modified cement slurry may further include perlite. Perlite is an ore and generally refers to a naturally occurring volcanic, amorphous siliceous rock including mostly silicon dioxide and aluminum oxide. The perlite may be expanded and/or unexpanded as suitable for a particular application. The expanded or unexpanded perlite may also be ground, for example. The resin modified cement slurry may further include shale. A variety of shales may be suitable, including those including silicon, aluminum, calcium, and/or magnesium. Examples of suitable shales include vitrified shale and/or calcined shale.

Zeolites are generally porous alumino-silicate minerals that may be either natural or synthetic. Synthetic zeolites are based on the same type of structural cell as natural zeolites and may comprise aluminosilicate hydrates. As used herein, the term "zeolite" refers to all natural and synthetic forms of zeolite.

Amorphous silica is generally a byproduct of a ferrosilicon production process, wherein the amorphous silica may be formed by oxidation and condensation of gaseous silicon suboxide, SiO, which is formed as an intermediate during the process. Amorphous silica as a supplemental cementitious material may be included in embodiments to increase cement compressive strength.

"Hydrated lime" as used herein will be understood to mean calcium hydroxide. In some embodiments, the hydrated lime may be provided as quicklime (calcium oxide) which hydrates when mixed with water to form the hydrated lime. The hydrated lime may be included in examples of the resin modified cement slurry, for example, to form a hydraulic composition with the supplementary cementitious components. For example, the hydrated lime may be included in a supplementary cementitious material-to-hydrated-lime weight ratio of about 10:1 to about 1:1 or 3:1 to about 5:1. In some examples, the hydrated lime may be present in an amount ranging between any of and/or including any of about 10%, about 20%, about 40%, about 60%, or about 80% by weight of the resin modified cement slurry.

Lime may be present in the resin modified cement slurry in several; forms, including as calcium oxide and or calcium hydroxide or as a reaction product such as when Portland cement reacts with water. Alternatively, lime may be included in the resin modified cement slurry by amount of silica in the resin modified cement slurry. A resin modified cement slurry may be designed to have a target lime to silica weight ratio. The target lime to silica ratio may be a molar ratio, molar ratio, or any other equivalent way of expressing a relative amount of silica to lime. Any suitable target time to silica weight ratio may be selected including from about 10/90 lime to silica by weight to about 40/60 lime to silica by weight. Alternatively, About 10/90 lime to silica by weight to about 20/80 lime to silica by weight, about 20/80 lime to silica by weight to about 30/70 lime to silica by weight, or about 30/70 lime to silica by weight to about 40/63 lime to silica by weight.

Where used, one or more of the aforementioned supplementary cementitious materials may be present in the resin modified cement slurry. For example, without limitation, one or more supplementary cementitious materials may be present in an amount of about 0.1% to about 80% by weight of the resin modified cement slurry. For example, the perlite may be present in an amount ranging between any of and/or including any of about 0.1%, about 10%, about 20%, about 30%, about 40%, about 50%, about 60%, about 70%, or about 80% by weight of the resin modified cement slurry.

Other additives suitable for use in accordance with the present disclosure may be included in embodiments of the resin modified cement slurry. Examples of such additives include, but are not limited to: weighting agents, lightweight additives, gas-generating additives, mechanical-property-enhancing additives, lost-circulation materials, filtration-control additives, fluid-loss-control additives, defoaming agents, foaming agents, thixotropic additives, polymeric additives, organophilically modified clay, bentonine, diatomaceous earth, gilsonite, scleroglucan carragenans, xanthan, welan, diutan gums, celluloses, hydroxyl ethyl celluloses, acrylamide polymers, acrylic acid-acrylamide c-polymers, acrylamide co-polymers, and combinations thereof. In embodiments, one or more of these additives may be added to the resin modified cement slurry after storing but prior to the placement of a resin modified cement slurry into a carbon capture underground storage formation. In some examples, the resin modified cement slurry may further include a dispersant. Examples of suitable dispersants include, without limitation, sulfonated-formaldehyde-based dispersants (e.g., sulfonated acetone formaldehyde condensate) or polycarboxylated ether dispersants. In some examples, the dispersant may be included in the resin modified cement slurry in an amount in the range of from about 0.01% to about 5% by weight of the cementitious materials. In specific examples, the dispersant may be present in an amount ranging between any of and/or including any of about 0.01%, about 0.1%, about 0.5%, about 1%, about 2%, about 3%, about 4%, or about 5% by weight of a cement, slurry, or cementitious components. In some embodiments, suspension additives may be included in any suitable amount, including at a point in a range of from about 0.1% to about 5% by volume of the resin modified cement slurry. Alternatively, from about 0.1% to about 1% by volume, about 1% to about 3% by volume, about 3% to about 5% by volume, or any ranges therebetween.

In some examples, an additive may comprise a solvent to reduce viscosity of the resin modified cement slurry for case of handling, mixing, and transferring. Generally, any solvent that is compatible with a curable resin and that achieves the desired viscosity effect may be suitable for use in a resin modified cement slurry. Suitable solvents may include, but are not limited to, polyethylene glycol, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene, fatty acid methyl esters, and combinations thereof. Selection of an appropriate solvent may be dependent on the curable resin chosen. In some examples, the amount of the solvent used in a resin modified cement slurry may be in the range of about 0.1% to about 30% by volume of the resin modified cement slurry. Alternatively, the solvent may be present in an amount of about 0.1% to about 10%, about 10% to about 20%, or about 20% to about 30% by volume of a resin modified cement slurry. Alternatively, a resin modified cement slurry may be heated to reduce its viscosity, in place of, or in addition to, using a solvent.

In some examples, an additive may include a cement retarder. A broad variety of cement retarders may be suitable for use in the resin modified cement slurries. For example, the cement retarder may comprise phosphonic acids, such as ethylenediamine tetra(methylene phosphonic acid), diethylenetriamine penta(methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose (HEC) and carboxymethyl hydroxyethyl cellulose (CMHEC); synthetic co- or ter-polymers comprising sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof, or mixtures thereof. Examples of suitable cement retarders include, among others, phosphonic acid derivatives. Generally, the cement retarder may be present in the resin modified cement slurry in an amount sufficient to delay the setting for a desired time. In some examples, the cement retarder may be present in the resin modified cement slurry in an amount in the range of from about 0.01% to about 10% by weight of the cementitious materials. In specific examples, the cement retarder may be present in an amount ranging between any of and/or including any of about 0.01%, about 0.1%, about 1%, about 2%, about 4%, about 6%, about 8%, or about 10% by weight of a cement, slurry, or cementitious components.

In some examples, an additive may include a silane coupling agent. The silane coupling agent may be used, among other things, to act as a mediator to help bond a resin to the surface of the subterranean formation, and/or the surface of the wellbore. Examples of suitable silane coupling agents include, but are not limited to, N-2-(aminoethyl)-3-aminopropyltrimethoxysilane; 3-glycidoxypropyltrimethoxysilane; gamma-aminopropyltriethoxysilane; N-beta-(aminoethyl)-gamma-aminopropyltrimethoxysilanes; aminoethyl-N-beta-(aminoethyl)-gamma-aminopropyl-trimethoxysilanes; gamma-ureidopropyl-triethoxysilanes; beta-(3-4 epoxy-cyclohexyl)-ethyl-trimethoxysilane; gamma-glycidoxypropyltrimethoxysilanes; vinyltrichlorosilane; vinyltris (beta-methoxyethoxy) silane; vinyltriethoxysilane; vinyltrimethoxysilane; 3-metacryloxypropyltrimethoxysilane; beta-(3,4 epoxycyclohexyl)-ethyltrimethoxysilane; r-glycidoxypropyltrimethoxysilane; r-glycidoxypropylmethylidiethoxysilane; N-beta-(aminoethyl)-r-aminopropyl-trimethoxysilane; N-beta-(aminoethyl)-r-aminopropylmethyldimethoxysilane; 3-aminopropyl-triethoxysilane; N-phenyl-r-aminopropyltrimethoxysilane; r-mercaptopropyltrimethoxysilane; r-chloropropyltrimethoxysilane; vinyltrichlorosilane; vinyltris (beta-methoxyethoxy) silane; vinyltrimethoxysilane; r-metacryloxypropyltrimethoxysilane; beta-(3,4 epoxycyclohexyl)-ethyltrimethoxysila; r-glycidoxypropyltrimethoxysilane; r-glycidoxypropylmethylidicthoxysilane; N-beta-(aminoethyl)-r-aminopropyltrimethoxysilane; N-beta-(aminoethyl)-r-aminopropylmethyldimethoxysilane; r-aminopropyltriethoxysilane; N-phenyl-r-aminopropyltrimethoxysilane; r-mercaptopropyltrimethoxysilane; r-chloropropyltrimethoxysilane; N[3-(trimethoxysilyl)propyl]-ethylenediamine; substituted silanes where one or more of the substitutions contains a different functional group; and combinations thereof. The silane coupling agent may be included as an additive or as a component of the hardener.

Resin modified cement slurries generally should have a density suitable for a particular application. By way of example, the resin modified cement slurry may have a density in the range of from about 4 pounds per gallon ("lbm/gal") (479 kg/m^3) to about 20 lbm/gal (2396 kg/m^3). In certain embodiments, the resin modified cement slurry may have a density in the range of from about 8 lbm/gal (958 kg/m^3) to about 17 lbm/gal (2037 kg/m^3) or about 8 lbm/gal (958 kg/m^3) to about 14 lbm/gal (1677 kg/m^3). Examples of the resin modified cement slurries may be foamed or unfoamed or may comprise other means to reduce their densities, such as hollow microspheres, low-density elastic beads, or other density-reducing additives known in the art.

In some examples, the resin modified cement slurries may set to have a desirable compressive strength. Compressive strength is generally the capacity of a material or structure to withstand axially directed pushing forces. The compressive strength may be measured at a specified time after the resin modified cement slurry has been activated and the resultant composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ ultrasonic cement analyzer, available from Fann Instrument Company, Houston, TX. Compressive strength values may be determined in accordance with API RP 10B-2, *Recommended Practice for Testing Well Cements*, First Edition, July 2005.

By way of example, the resin modified cement slurries may develop a 24-hour compressive strength in the range of from about 50 psi (344 kPa) to about 10000 psi (68947 kPa). Alternatively, from about 50 psi (344 kPa) to about 1000 (6894 kPa), from about 1000 (6894 kPa) to about 5000 psi (34473 kPa), from about 5000 psi (34473 kPa) to about 10000 psi (68947 kPa), or any ranges therebetween. In some examples, the resin modified cement slurry may develop a compressive strength in 24 hours of at least about 50 psi (344 kPa), at least about 100 psi (689 kPa), at least about 500 psi (3447 kPa), at least about 1000 (6894 kPa), at least about 5000 psi (34473 kPa), at least about 10000 psi (68947 kPa), or more. In some examples, the compressive strength values may be determined using destructive or non-destructive methods at a temperature ranging from 100° F. (37.7° C.) to 200° F. (93.3° C.).

The disclosed resin modified cement slurries may have improved resistance to carbonation. As used herein, the term "improved resistance to carbonation" and "carbonation-resistant barrier" may refer to that property of a substance or material which demonstrates a greater resistance to penetration of a carbonation front when exposed for a period of time in the presence of carbon dioxide relative to a Portland cement consisting of Portland cement and water without resin or hardener. For example, a "material having an improved resistance to carbonation" may refer to any material composition wherein a penetration rate of a carbonation front in the material when exposed in the presence of a carbon dioxide at a specified concentration is less than the penetration rate of a carbonation front in a Portland cement without resin exposed to carbon dioxide at the same concentration and under the same general conditions. Alternatively, the phrase may refer to any material that, upon measurement using a phenolphthalein test after a specified period of exposure in supercritical carbon dioxide, a stronger fuchsia color is present than in what would be present if the same were performed on a generic Portland cement consisting of Portland cement and water under the same or similar conditions and having the same specified period of exposure and concentration.

A method of estimating resistance to carbonation can include estimating penetration of a carbonation front in a cement sample. A carbonation front can be induced in a cement sample by exposing the cement sample to a carbon dioxide environment and allowing the carbon dioxide to penetrate into the cement sample. The carbon dioxide environment can include dry supercritical carbon dioxide, wet supercritical carbon dioxide, carbonic acid, or any other suitable carbon dioxide environment to induce carbonation in the cement sample. The time for exposure to the carbon dioxide environment can vary from about 1 day to about 2 months. Alternatively, from about 1 day to about 1 week, from about 1 week to about 1 month, from about 1 month to about 2 months, or any ranges therebetween. It is not believed that there is any upper limit of exposure time which would be unsuitable as generally the longer a cement is exposed, the more clearly the carbonation front may be seen. As such, it may be desired to expose the cement sample for any arbitrary length of time to monitor progression of the carbonation front. After exposure to the carbon dioxide environment, the cement sample can be exposed to a pH indicator solution capable of indicating presence of a basic environment, such as naphtholphthalein, cresol red, cresolphthalein, thymolphthalein, alizarine yellow R, indigo carmine, phenolphthalein, or any other suitable basic pH indicator.

Without being limited by theory, it is believed that the combination of resins and hardeners within the resin modified cement slurry form polymeric microstructures throughout the set cement and on outer surfaces of the set cement that impede carbonation. The ability of the set cement to impede carbonation may therefore be attributed to steric interactions between polymeric microstructures formed within the resin modified cement and carbon dioxide and/or carbonic acid. Alternatively, the ability may be attributed more generally to steric interactions between the resin-hardener system and carbon dioxide, or between the reaction products of a resin-hardener system and carbon dioxide. The set cement may be further characterized by either a hydrophobicity or an ability to repel water. By impeding the carbonation, the set cement prevents or reduces acidification of the cement and thus prevents or reduces protonation of both calcium silicate hydrate and calcium hydroxide by carbonic acid in the set cement. Carbonic acid may form as a result of injected or naturally present $CO_2$ gas coming into contact with any of free water in the formation, water entrained in the hydrated cement, or water chemically bonded within the hydrated cement. The hydrated cement may form a part of a barrier, sealant, or plug. This prevention or reduction of protonation of calcium silicate hydrate and calcium hydroxide by carbonic acid thereby prevents or reduces the formation of calcium carbonate and calcium bicarbonate in the cement and results in minimized leaching of water-soluble calcium bicarbonate from the set cement. Overtime, reduced leaching of calcium bicarbonate allows the set cement to retain its low porosity, maintain mechanical properties such as tensile strength, compressive strength, and young's modulus of elasticity, and remain effective as a barrier, sealant, or plug separating the carbon dioxide injected into the formation and the atmosphere.

The resin modified cement slurries may be prepared by several methods, only some of which may be explicitly described herein. In one embodiment, a dry blend comprising the hydraulic cement and any supplementary cementitious materials and/or dry additives may be prepared at a cement bulk plant. In embodiments wherein the resin and/or hardener are in a solid phase, the solid phase resin and/or hardener may be included to the dry blend. The dry blend may then be mixed with water in a batch mixer or in a continuous mixer at a well site to produce the resin modified cement slurry which may then be introduced into the wellbore.

In embodiments where one of the resins and/or hardeners are in a liquid phase, a dry blend comprising hydraulic cement, supplementary cementitious materials, dry additives, and resin and/or hardener which are in a solid phase may be prepared at a cement bulk plant. Liquid resins, and/or hardeners may be metered into the water used to mix with the dry blend to form the resin modified cement slurry. Alternatively, the liquid additives, resins, or hardeners may be added in line to a mixture of the dry blend and the water. In some examples, a resin and hardener can be batch mixed to form a resin mixture which may then be metered into the water used to mix the resin modified cement slurry, or may be mixed in line with the dry blend, or may be mixed directly in a mixing tub with the water and dry blend.

After the resin modified cement slurry is prepared, the resin modified cement slurry can be introduced into a formation suitable for CCUS. Once the resin modified cement slurry is introduced into the CCUS well, it may be allowed to set or harden. Injection of carbon dioxide into the regions of the formation suitable for injection may occur before, during, or after the resin modified cement slurry is allowed to harden.

The formation may comprise any formation suitable for injection of carbon dioxide including, but not limited to, highly porous or permeable formations, depleted reservoirs/ formations, salt caverns, and the like. A depleted formation may be characterized, but not limited to, any of the following: by having a low pore pressure gradient, by having undergone a pore pressure reduction, by having a high porosity or permeability, and any combination thereof.

For example, a highly porous or permeable formations and/or depleted formation may have a permeability greater than 0.05 mD (millidarcy), greater than 0.1 mD, greater than 0.5 mD, greater than 0.8 mD, greater than 1 mD, greater than 1.5 mD, greater than 2 mD, greater than 5 mD, greater than 10 mD, greater than 20 mD, greater than 30 mD, greater than 40 mD, greater than 50 mD, greater than 100 mD, greater than 200 mD, greater than 300 mD, greater than 400 mD, greater than 450 mD, greater than 500 mD, greater than 550 mD, greater than 600 mD, greater than 700 mD, greater than 800 mD, or greater than 1000 mD. In embodiments, the depleted formation may have a permeability in a range of about 0.05 mD to about 1000 mD. Alternatively, in a range of about 0.05 mD to about 0.1 mD, in a range of about 0.1 mD to about 1 mD, in a range of about 1 mD to about 10 mD, in a range of about 10 mD to about 100 mD, in a range of about 100 mD to about 1000 mD, or any ranges therebetween.

In embodiments, a highly porous or permeable formations and/or depleted formation may have a porosity of greater than 60%, greater than 50%, greater than 45%, greater than 40%, greater than 35%, greater than 30%, greater than 25%, greater than 20%, greater than 15%, greater than 12%, greater than 11%, greater than 10%, greater than 9%, greater than 8%, greater than 7%, greater than 6%, greater than 5%, greater than 4%, greater than 3%, greater than 2.6%, greater than 2.4%, greater than 2.2%, greater than 2%, greater than 1.8%, greater than 1.6%, greater than 1.4%, greater than 1.2%, greater than 1%, greater than 0.8%, greater than 0.6%, or greater than 0.5%. In embodiments, the depleted formation may have a porosity in a range of from about 0.1% to about 60%. Alternatively, the depleted formation may have a porosity in a range of from about 0.1% to about 1%, in a range of from about 1% to about 10%, in a range of from about 10% to about 25%, in a range of from about 25% to about 60%, or any ranges therebetween.

In embodiments, a highly porous or permeable formations and/or depleted formation may have a pore pressure gradient less than 1 kPa/m, less than 2 kPa/m, less than 3 kPa/m, less than 4 kPa/m, less than 5 kPa/m, less than 6 kPa/m, less than 7 kPa/m, less than 8 kPa/m, less than 9 kPa/m, less than 9.5 kPa/m, less than 10 kPa/m, less than 10.5 kPa/m, less than 11 kPa/m, less than 12 kPa/m, less than 13 kPa/m, less than 14 kPa/m, less than 15 kPa/m, less than 16 kPa/m, less than 17 kPa/m, less than 18 kPa/m, less than 19 kPa/m, less than 20 kPa/m, less than 21 kPa/m, less than 22 kPa/m, or less than 23 kPa/m. Alternatively, a depleted formation may have a pore pressure gradient less than 4.33 psi/ft, less than 4.65 psi/ft, less than 4.2 psi/ft, less than 4.1 psi/ft, less than 4 psi/ft, less than 3.8 psi/ft, less than 3.6 psi/ft, or less than 3.3 psi/ft. In embodiments, the depleted formation may have a pore pressure gradient in a range of 1 kPa/m to 30 kPa/m. Alternatively, the depleted formation may have a pore pressure gradient in a range of about 1 kPa/m to about 10 kPa/m, in a range of about 10 kPa/m to about 20 kPa/m, in a range of about 20 kPa/m to about 30 kPa/m, or any ranges therebetween.

Depleted formations may also be characterized as having had a pore pressure reduction, wherein the pore pressure reduction may refer to a difference between a formation's reservoir pressure before and after depletion. The pore pressure reduction may also refer to a difference between measurements or estimates of a formation's reservoir pressure at any point during hydrocarbon production and abandonment or termination of the production. The pore pressure reduction may also refer to a difference between a formation's reservoir pressure at any two points during hydrocarbon production. The pore pressure reduction may also refer to a reservoir pressure reduction over a lifetime of a field, reservoir, or well.

In embodiments, a highly porous or permeable formations and/or depleted formation may have a total pore pressure less than 1 MPa, less than 5 MPa, less than 10 MPa, less than 20 MPa, less than 30 MPa, less than 39 MPa, less than 39.5 MPa, less than 40 MPa, less than 50 MPa, or less than 150 MPa. In embodiments, the depleted formation may have a total pore pressure in a range of about 0.001 Mpa to about 150 MPa. Alternatively, the depleted formation may have a total pore pressure in a range of about 0.001 Mpa to about 0.01 MPa, in a range of about 0.01 Mpa to about 0.1 MPa, in a range of about 0.1 Mpa to about 1 MPa, in a range of about 1 Mpa to about 10 MPa, in a range of about 10 Mpa to about 100 MPa, in a range of about 100 Mpa to about 150 MPa, or any ranges therebetween.

In embodiments, a highly porous or permeable formations and/or depleted formation may have an average pore throat radius greater than 0.0001 mm, greater than 0.001 mm, greater than 0.002 mm, greater than 0.003 mm, greater than 0.004 mm, greater than 0.005 mm, greater than 0.006 mm, greater than 0.007 mm, greater than 0.008 mm, greater than 0.009 mm, greater than 0.01 mm, greater than 0.02 mm, greater than 0.03 mm, greater than 0.04 mm, or greater than 0.05 mm. In embodiments, the depleted formation may have an average pore throat radius in a range of about 0.0001 mm to about 0.01 mm. Alternatively, the depleted formation may have an average pore throat radius in a range of about 0.0001 mm to about 0.0005 mm, in a range of about 0.0005 mm to about 0.001 mm, in a range of about 0.001 mm to about 0.01 mm, or any ranges therebetween.

In embodiments, a highly porous or permeable formations and/or depleted formation may have a reduction in pore pressure that is at least 0.1 MPa, at least 0.5 MPa, at least 1 MPa, at least 1.5 MPa, at least 1.8 MPa, at least 2 MPa, at least 5 MPa, at least 10 MPa, at least 15 MPa, at least 20 MPa, at least 25 MPa, at least 30 MPa, at least 35 MPa, at least 40 MPa, at least 50 MPa, or at least 60 MPa. In other examples, the depleted formation may have had a reduction in pore pressure that is at least 0.01 kPa/m, at least 0.1 kPa/m, at least 0.2 kPa/m, at least 0.3 kPa/m, at least 0.4 kPa/m, at least 0.45 kPa/m at least 0.5 kPa/m, at least 0.6 kPa/m, at least 0.7 kPa/m, at least 0.8 kPa/m, at least 0.9 kPa/m, at least 1 kPa/m, at least 2 kPa/m, at least 3 kPa/m, at least 4 kPa/m, at least 5 kPa/m, at least 6 kPa/m, at least 7 kPa/m, at least 8 kPa/m, at least 9 kPa/m, at least 9.5 kPa/m, or at least 10 kPa/m. In embodiments, the depleted formation may have a reduction in pore pressure in a range of about 0.1 MPa to 60 MPa. Alternatively, the depleted formation may have a reduction in pore pressure in a range of about 0.1 MPa to 1 MPa, in a range of about 1 MPa to 10 MPa, in a range of about 10 MPa to 25 MPa, in a range of about 25 MPa to 60 MPa, or any ranges therebetween.

Referring now to FIG. 1, the preparation of a resin modified cement slurry in accordance with example embodiments will now be described. FIG. 1 illustrates a system 100 for the preparation of a resin modified cement slurry and subsequent delivery of the composition to a wellbore in accordance with certain embodiments. As shown, the resin modified cement slurry may be mixed in mixing equipment 104, such as a jet mixer, re-circulating mixer, or a batch mixer, for example, and then pumped via pumping equipment 106 to the wellbore. In some embodiments, the mixing equipment 104 and the pumping equipment 106 may be disposed on one or more cement trucks. In some embodiments, a jet mixer may be used, for example, to continuously mix the settable materials with the water as it is being pumped to the wellbore. In some embodiments, a re-circulating mixer and/or a batch mixer may be used to mix the components of the resin modified cement slurry, and one or more components of the composition may be added to the mixer prior to pumping the resin modified cement slurries downhole. Additionally, batch mixer type units for the slurry may be plumbed in line with a separate tank containing one or more components of the resin modified cements slurry composition. The one or more components may then be fed in-line with a mixture as it is pumped out of the mixing unit.

Figure 2:
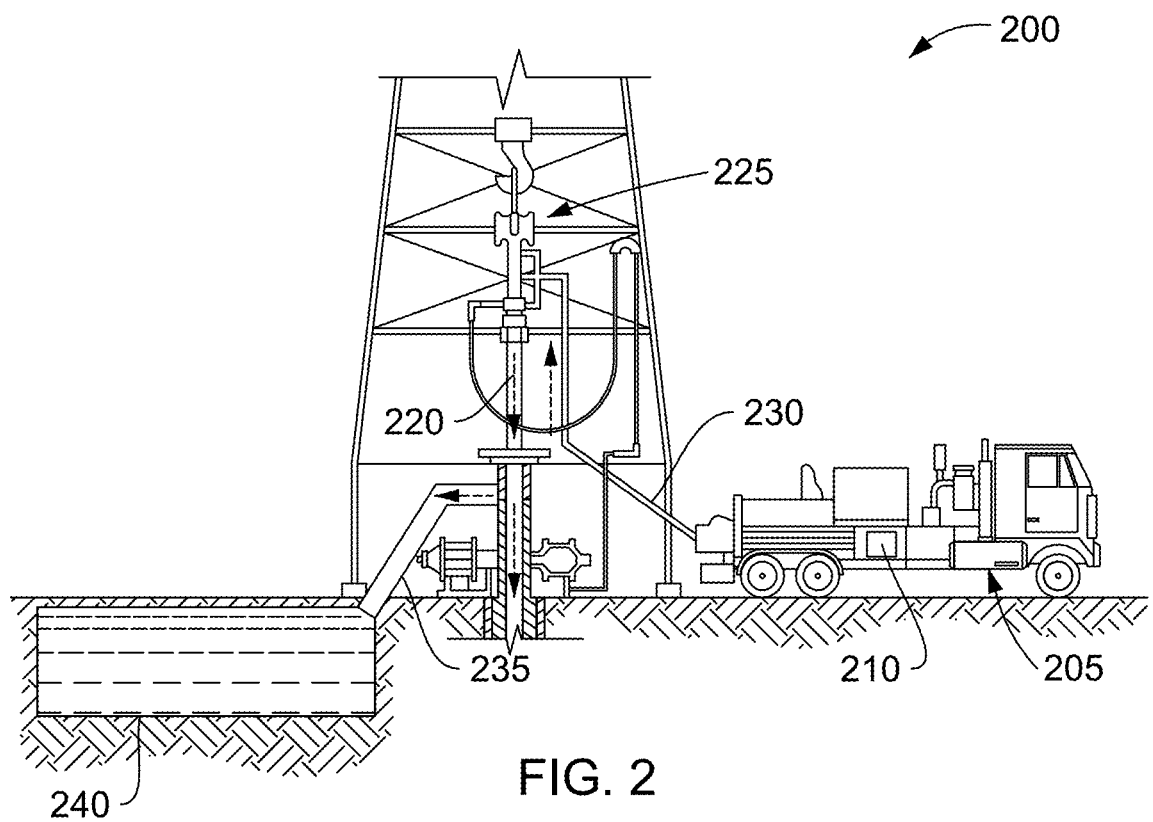
FIG. 2 illustrates surface equipment that may be used in the placement of a resin modified cement slurry in a wellbore in accordance with certain embodiments.

An example technique for using a resin modified cement slurry in a CCUS cementing operation will now be described with reference to FIGS. 2 and 3. FIG. 2 illustrates surface equipment 200 that may be used in placement of a resin modified cement slurry in accordance with certain embodiments. It should be noted that while FIG. 2 generally depicts a land-based operation, however, the principles described herein are equally applicable to subsea operations that employ floating or sea-based platforms and rigs, without departing from the scope of the disclosure. As illustrated by FIG. 2, the surface equipment 200 may include a cementing unit 210, which may include one or more cement trucks 205. The cementing unit 210 may include mixing equipment 104 and pumping equipment 106 (e.g., FIG. 1). The cementing unit 210 may pump a resin modified cement slurry 220 through a feed pipe 230 and to a cementing head 225 which conveys the resin modified cement slurry 220 downhole.

Figure 3:
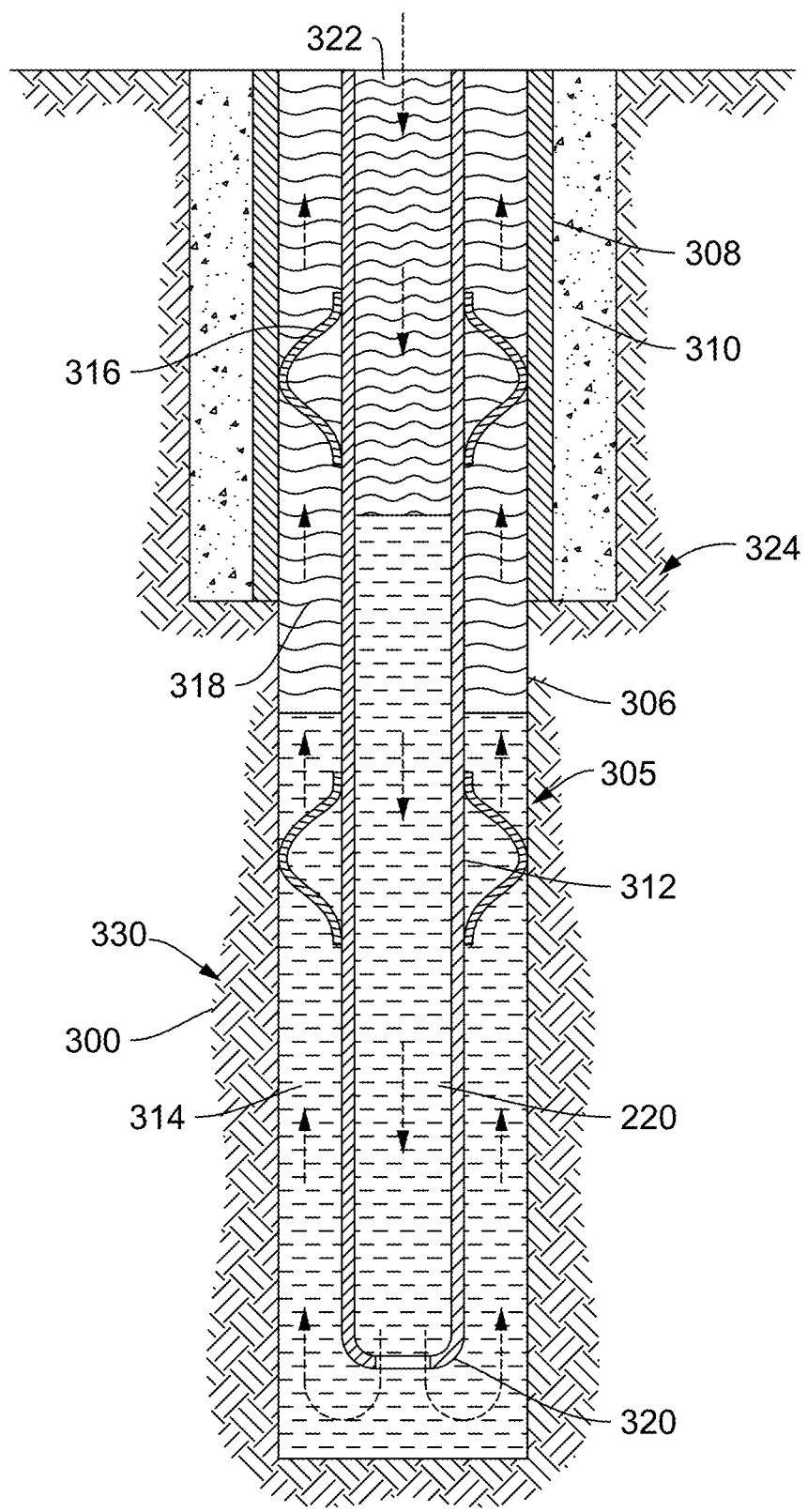
FIG. 3 illustrates the placement of a resin modified cement slurry into a wellbore annulus in accordance with certain embodiments.

Turning now to FIG. 3, the resin modified cement slurry 220 may be placed into a subterranean formation 300 containing a carbon dioxide injection zone 330. As illustrated, a wellbore 305 may be drilled into the subterranean formation 300. Wellbore 305 may comprise the CCUS well. Herein, a CCUS well may be characterized as overlapping or intersecting with the carbon dioxide injection zone 330 of subterranean formation 300 and a caprock 324. While wellbore 305 is shown extending generally vertically into the subterranean formation 300, the principles described herein are also applicable to wellbores that extend at an angle through the subterranean formation 300, such as horizontal and slanted wellbores. As illustrated, the wellbore 305 comprises walls 306. In the illustrated embodiment, a casing 308 has been inserted into the wellbore 305. The casing 308 may be cemented to the walls 306 of the wellbore by cement sheath 310. In the illustrated embodiment, one or more additional conduits (e.g., intermediate casing, production casing, liners, etc.), shown here as casing 312 may also be disposed in the wellbore 305. As illustrated, there is a wellbore annulus 314 formed between the casing 312 and the walls 306 of the wellbore 305 and/or the casing 308. One or more centralizers 316 may be attached to the casing 312, for example, to centralize the casing 312 in the wellbore 305 prior to and during a cementing operation.

With continued reference to FIG. 3, the resin modified cement slurry 220 may be pumped down the interior of the casing 312. The resin modified cement slurry 220 may be allowed to flow down the interior of the casing 312 through the casing shoe 320 at the bottom of the casing 312 and up around the casing 312 into the wellbore annulus 314. The resin modified cement slurry 220 may be allowed to set in the wellbore annulus 314, for example, to form a cement sheath that supports and positions the casing 312 in the wellbore 305. Other techniques may also be utilized for introduction of the resin modified cement slurry 220. By way of example, reverse circulation techniques may be used that include introducing the resin modified cement slurry 220 into the subterranean formation 300 by way of the wellbore annulus 314 instead of through the casing 312. As it is introduced, the resin modified cement slurry 220 may displace other fluids 318, such as drilling fluids and/or spacer fluids that may be present in the interior of the casing 312 and/or the wellbore annulus 314. At least a portion of the displaced fluids 318 may exit the wellbore annulus 314 via a flow line 235 and be deposited, for example, in one or more retention pits 240 (e.g., a mud pit). A displacement fluid 322 may be utilized to push resin modified cement slurry 220 into annulus 314.

The resin modified cement slurry may harden to form a set cement. The set cement may overlap with or intersect carbon dioxide injection zone 330 of subterranean formation 300 caprock 324. Caprock 324 refers to a more resistant rock type overlying a less resistant rock type. Resistance in this definition may refer to lower permeability and/or a lower porosity of the rock type. Otherwise, resistance may refer to a greater impenetrability of carbon dioxide disposed within a region of a formation below the caprock. In some embodiments, a liner hanger assembly may be disposed at any depth within the wellbore including at a depth at or below the cement sheath 310. A liner hanger assembly may comprise mechanical components, such as a liner-top polished bore receptable, also known as a tie-back sleeve or tie-back extension, a liner-top packer or liner setting sleeve, a setting sleeve, a casing liner hanger, a cement displacement system, a seal nipple, liner hanger running tools, setting collars, top set couplings, running subs, and any combinations thereof. The liner hanger assembly may also comprise hydraulic components.

In some embodiments, a resin modified cement slurry in accordance with the present disclosure may be used as an annular sealant or plugging material having an improved resistance to carbonation. In some embodiments, the plugging material or annular sealant may be disposed inside the casing 312 or annulus 314 of FIG. 3. In some embodiments, the resin modified cement slurry may form a barrier between carbon dioxide injected into carbon dioxide injection zone 330 to isolate casing 312 from the carbon dioxide injection zone 330. In some embodiments, the barrier may be at least partially impervious or effectively impervious to carbonation or have reduced susceptibility to penetration of a carbonation front into a matrix of the set cement as compared to a Portland cement consisting of Portland cement and water without a resin or hardener. In some embodiments, the barrier may be at least partially impervious to or have reduced susceptibility to leaching, such as leaching compared to a Portland cement consisting of Portland cement and water without a resin or hardener. The imperviousness or reduced susceptibility to either the penetration of a carbonation front or leaching may be attributable to any of an individual component of the resin modified cement slurry, a combination of components in the composition, polymeric microstructures formed after the composition is allowed to set, and any combinations thereof.

Referring again to FIG. 3, in some embodiments, carbon dioxide may be introduced into carbon dioxide injection zone 330 through casing 312 in the wellbore 305 and into fractures, voids, or spaces disposed within the subterranean formation 300. The subterranean formation 300 may be, to use non-limiting examples, hydrocarbon-bearing, depleted, or partially depleted. "Depleted" herein refers to, in addition to its generally known meaning, a formation that was previously hydrocarbon-bearing and later characterized by a reduction in its hydrocarbon production capability or quality. Formations may become depleted as a consequence of a hydrocarbon production operation. Depleted formations may be characterized as having low pore pressures and/or high permeabilities and/or high porosities making them ideal injection zones for carbon dioxide. Alternatively, the resin modified cement slurry may be used in methods where carbon dioxide is introduced into a salt cavern having conditions suitable for carbon dioxide injection.

In remedial-cementing examples, a resin modified cement slurry may be used, for example, in a squeeze-cementing operation or in the placement of cement plugs. By way of example, the resin modified cement slurry may be placed in a wellbore to plug voids, such as holes or cracks in the pipe strings; holes, cracks, spaces, or channels in the sheath; and very small spaces (commonly referred to as "micro-annuli") between the sheath and the exterior surface of the pipe or well-bore wall. Alternatively, the resin modified cement slurry may be placed in a wellbore to plug permeable or porous zones in the formation or to plug gravel packs.

Figure 4:
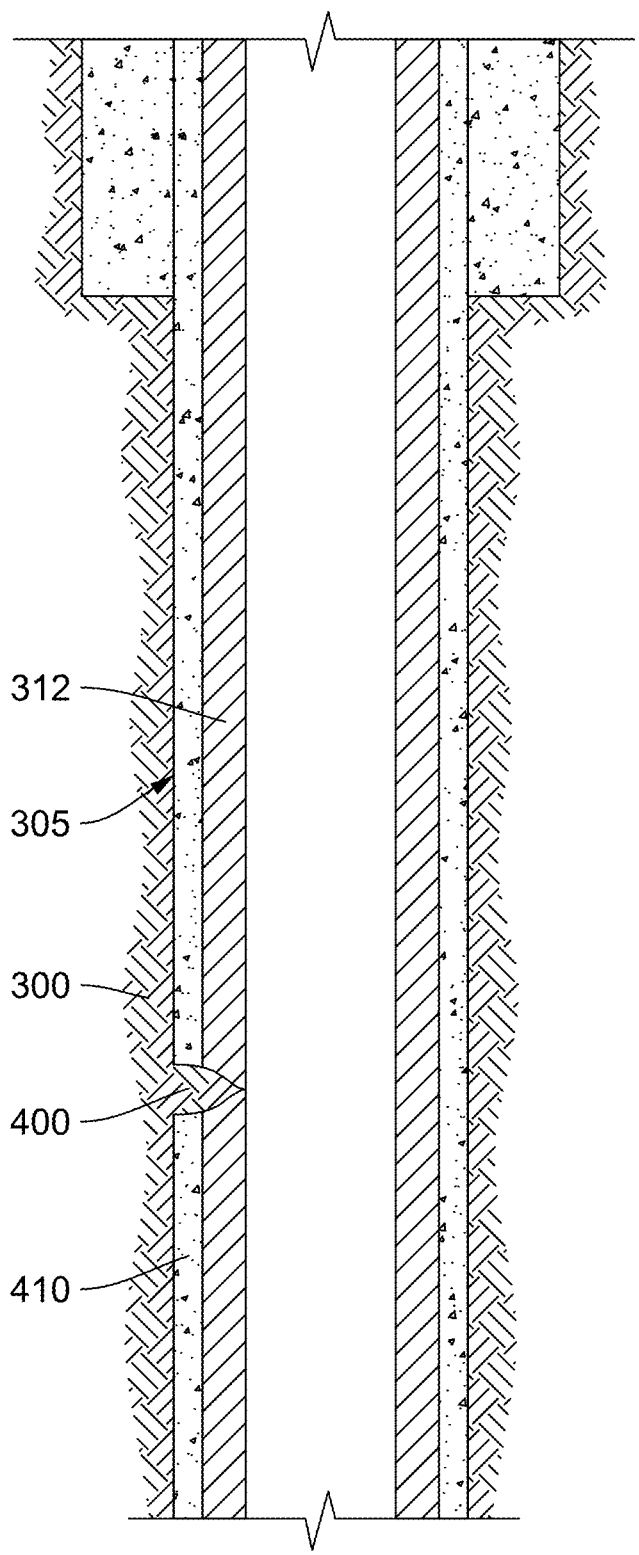
FIG. 4 is a schematic illustration showing the presence of a small perforation in a casing and protective sheath in a wellbore.
Figure 5:
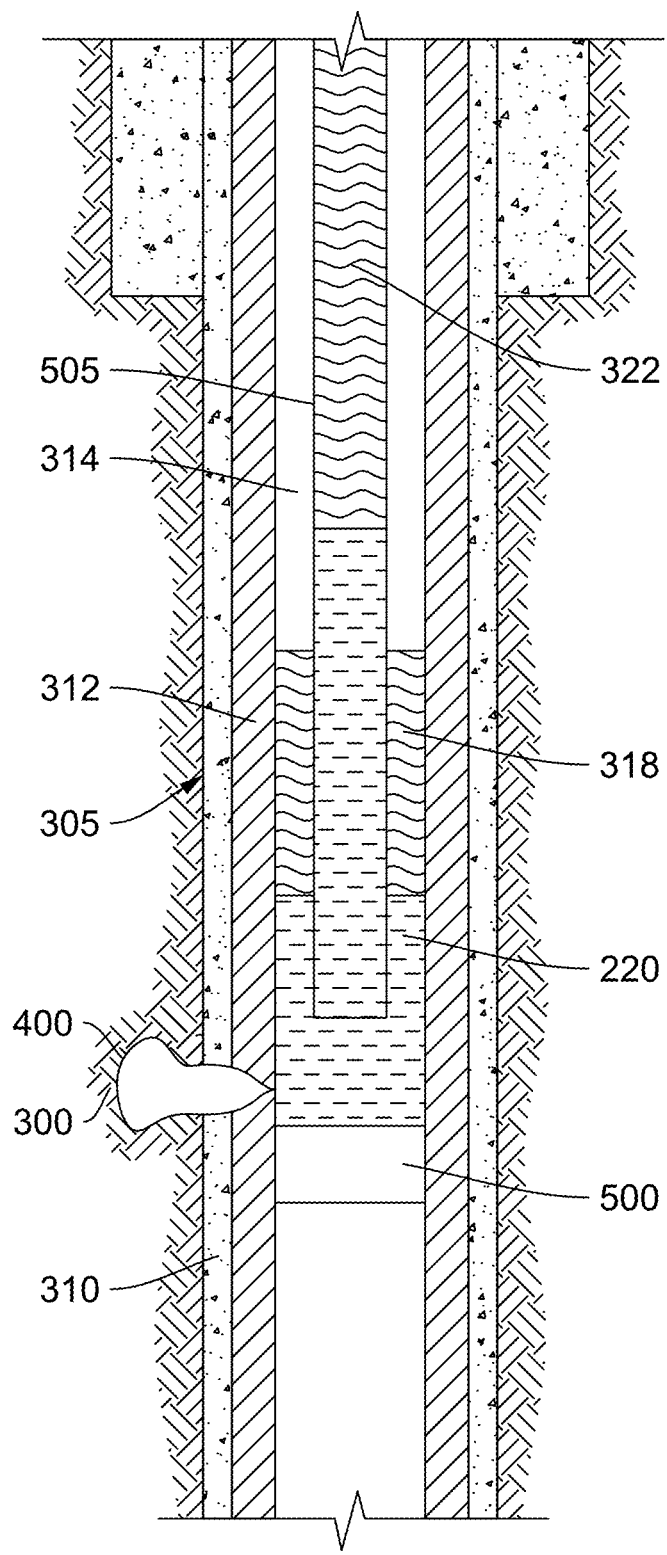
FIG. 5 is a schematic illustration of an example in which a resin modified cement slurry is used in a remedial application.

FIGS. 4 and 5 illustrate methods of remedial or secondary cementing. Turning now to FIG. 4, there is shown a partial cross-section of a conventional producing wellbore 305 that has a primary cemented casing 312. The protective cement sheath 410 around the casing 312 may have defects potentially caused by a variety of issues, such as improper curing of the protective cement sheath 410 while it was being formed. Alternatively, the primary cementing may have been successful, but due to adverse temperatures and pressures within the subterranean formation 300, the casing 312 and/or the protective cement sheath 410 surrounding the casing 312 may form cracks or other types of small casing leaks 400. Small casing leaks 400 may be problematic since they may facilitate the introduction of undesirable fluids and/or gases into the casing 312, such as carbon dioxide gas injected into the formation. As shown in FIG. 4, small casing leak 400 has formed in the protective cement sheath 410 and the casing 312, potentially allowing the introduction of undesirable fluids or gases into the interior of the casing 312.

Referring now to FIG. 5, small casing leak 400 may be filled or plugged by a resin modified cement slurry 220. A plug 500 (the plug 500 may be any type of plug, e.g., bridge plug, etc.) may be initially placed adjacent and below small casing leak 400, to form a barrier to prevent resin modified cement slurry 220 from flowing down the wellbore 305 and therefore allow resin modified cement slurry 220 of the present disclosure to fill small perforations 400 in the casing 312 and protective cement sheath 410. As shown in FIG. 5, tubing 505 (e.g., coiled tubing, drill pipe, etc.) may be lowered into wellbore 305. A first spacer fluid 318 may be pumped into the wellbore 305 via the tubing 505 and allowed to flow down the interior of the tubing 505 and into the blocked section of the wellbore 305 created by the plug 500. A portion of the first spacer fluid 318 may then flow through small casing leak 400 while another portion may reside in the wellbore annulus 314. After pumping the first spacer fluid 318 through the tubing 305, the resin modified cement slurry 220 may be pumped through the tubing 505. The resin modified cement slurry 220 may be pumped down the interior of the tubing 505 and into the blocked section of the wellbore 305 created by the plug 500. A portion of the resin modified cement slurry 220 may then flow through small casing leak 400 while another portion may reside in the wellbore annulus 314. The resin modified cement slurry 220 may be allowed to set in small casing leak 400 and in a portion of the wellbore annulus 314, for example, to form a hardened mass that seals small casing leak 400 to prevent the migration of undesirable fluids into the interior of the casing 312. After the resin modified cement slurry 220 has been pumped into the tubing 505, a second spacer fluid 322 may be pumped into the tubing 505 and allowed to flow down the interior of the tubing 505 into the blocked section of the wellbore 305 created by the plug 500 and up around the tubing 505 into the wellbore annulus 314. Alternatively, one or no spacer fluids may be used, and resin modified cement slurry 220 may not need to be separated from other fluids introduced previously or subsequently into wellbore 305. The tubing 505 may then be removed. The plug 500 may also be removed. In alternative examples, plug 500 may remain in the wellbore 305 and be drilled through. After tubing 305 is removed, the portion of the hardened resin modified cement slurry 220 remaining in the wellbore 305 (i.e., the portion not in small casing leak 400) may then be drilled through.

Figure 6:
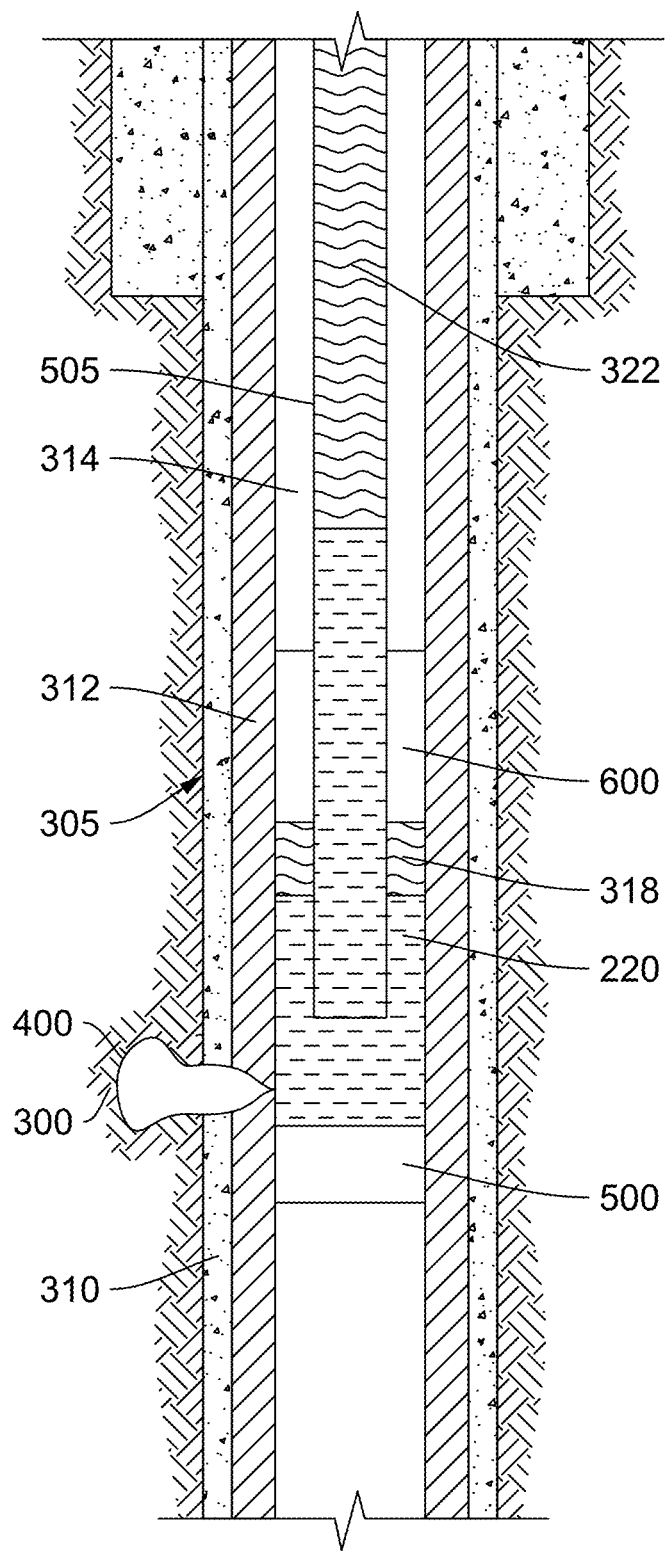
FIG. 6 is another schematic illustration of an example in which a resin modified cement slurry is used in a remedial application.

FIG. 6 describes another example of filling casing leak 400 with a resin modified cement slurry 220. A plug 500 (the plug 500 may be any type of plug, e.g., bridge plug, etc.) may be initially placed adjacent and below casing leak 400, to form a barrier that may allow pressurized pumping of a resin modified cement slurry 220 of the present disclosure to fill any casing leak 400 in the casing 312 and protective cement sheath 310. As shown in FIG. 6, tubing 505 (e.g., coiled tubing, drill pipe, etc.) may be lowered into wellbore 305. Tubing 505 may be attached to a retainer 600 or may be inserted into a retainer 600 already placed into the wellbore 305. Retainer 600 may allow for the pressurized pumping of the resin modified cement slurry 220 into any small casing leak 400. Retainer 600 must be placed adjacent to and above casing leak 400 to be filled by resin modified cement slurry 220. Retainer 600 may be any type of retainer, for example, a cement retainer. After plug 500, tubing 505, and retainer 600 are placed, a first spacer fluid 318 may be pumped into the wellbore 305 via the tubing 505 and allowed to flow down the interior of the tubing 505 and into the blocked section of the wellbore 305 created by the plug 500. A portion of the first spacer fluid 318 may then flow through casing leak 400. After pumping the first spacer fluid 318 through the tubing 505, the resin modified cement slurry 220 may be pumped through the tubing 505. The resin modified cement slurry 220 may be pumped down the interior of the tubing 505 and into the blocked section of the wellbore 305 created by the plug 500. A portion of the resin modified cement slurry 220 may then flow through casing leak 400 while another portion may reside in the space formed between the plug 500 and retainer 600. The resin modified cement slurry 220 may be allowed to set in casing leak 400 and in the space formed between the plug 500 and retainer 600. The resin modified cement slurry 220 may then harden to form a hardened mass that seals small casing leak 400 to prevent the migration of undesirable fluids into the interior of the casing 312. After the resin modified cement slurry 220 has been pumped into the tubing 505, a second spacer fluid 322 may be pumped into the tubing 505 and allowed to flow down the interior of the tubing 505 into the blocked section of the wellbore 305 created by the plug 500 and into the space formed between the plug 500 and retainer 600. Alternatively, one or no spacer fluids may be used, and resin modified cement slurry 220 may not need to be separated from other fluids introduced previously or subsequently into wellbore 305. The tubing 505 may then be removed. The plug 500 may also be removed. In alternative examples, plug 500 may remain in the wellbore 305 and be drilled through. Retainer 600 may also be removed. Conversely, in alternative examples, retainer 600 may be drilled through. After tubing 505 is removed, the portion of the hardened resin modified cement slurry 220 remaining in the wellbore 305 (i.e., the portion not in the small casing leak 400) may then be drilled through.

Figure 7:
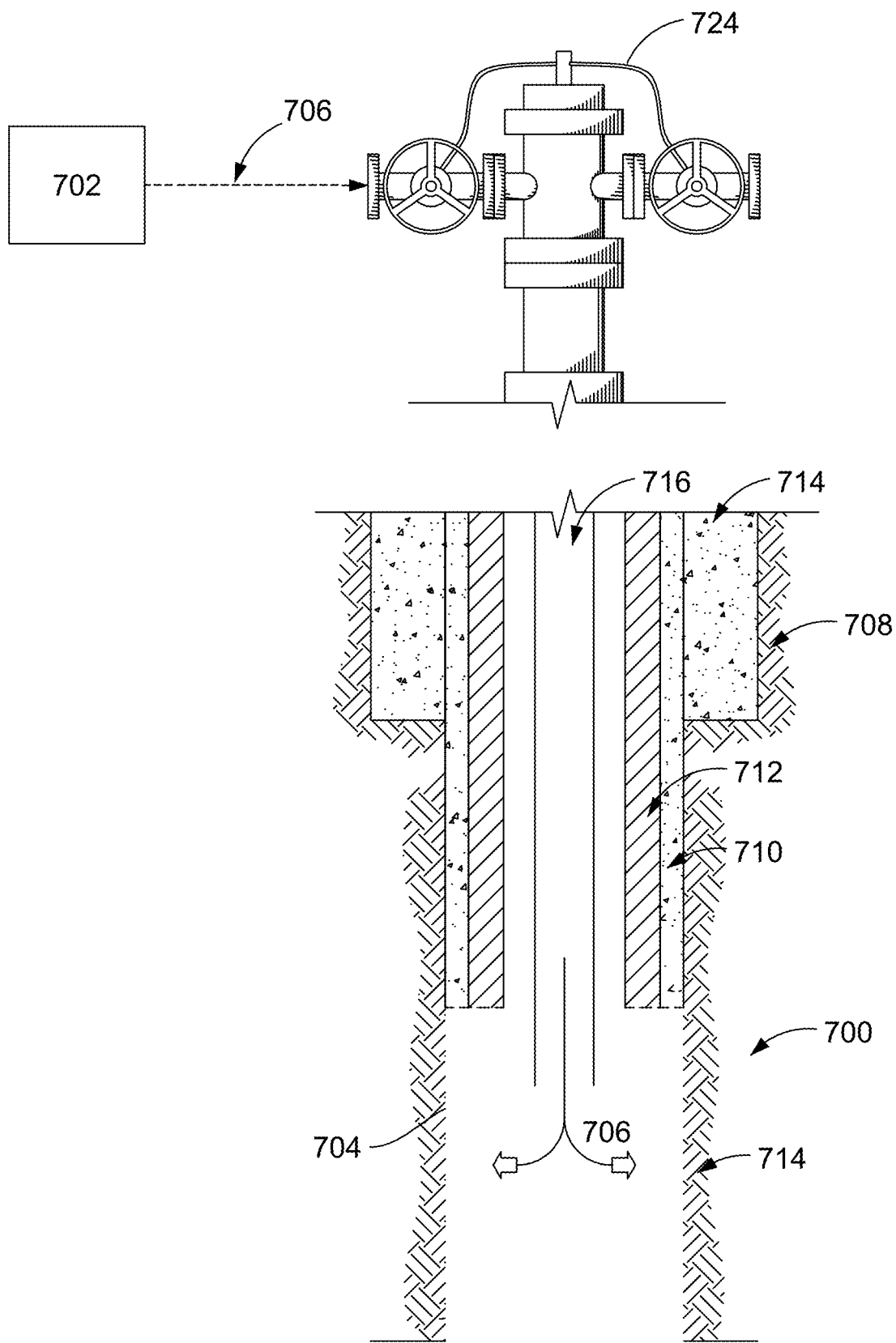
FIG. 7 illustrates injection of carbon dioxide into a carbon dioxide injection zone of a in accordance with certain embodiments.
Figure 8A:
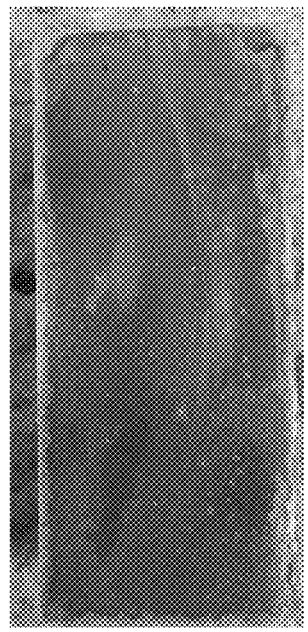
FIG. 8A is a picture of neat cement exposed to one week of saturated carbon dioxide.
Figure 8C:
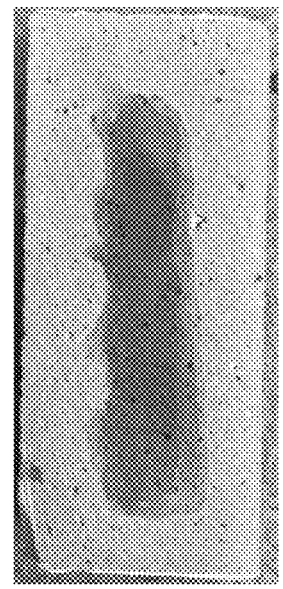
FIG. 8C is a picture of water extended cement exposed to one week of saturated carbon dioxide.
Figure 8B:
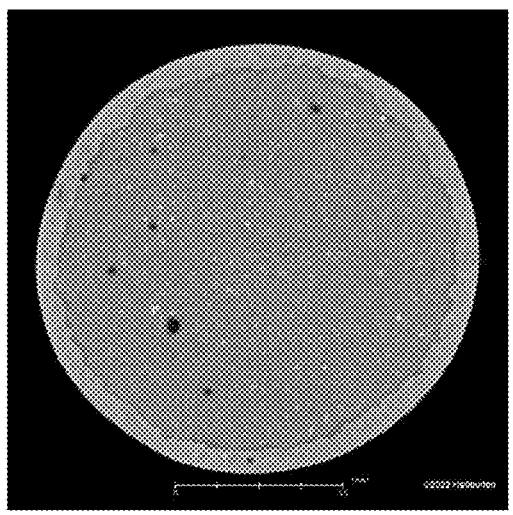
FIG. 8B is a picture of neat cement exposed to one week of saturated carbon dioxide.
Figure 8D:
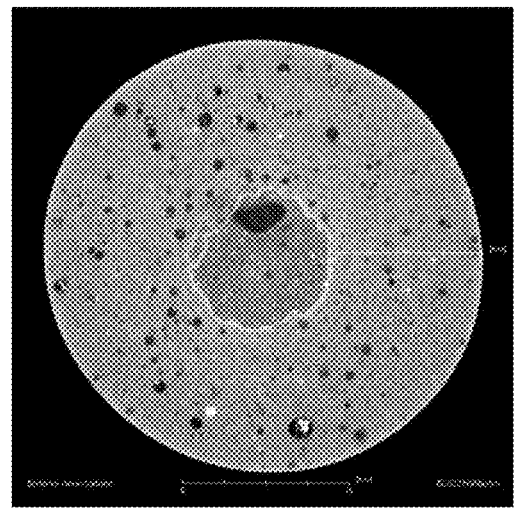
FIG. 8D is a picture of water extended cement exposed to one week of saturated carbon dioxide.
Figure 8E:
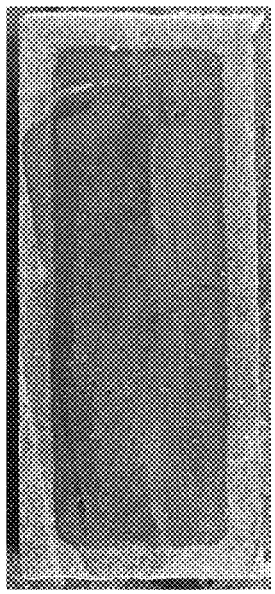
FIG. 8E is a picture of reduced Portland cement exposed to one week of saturated carbon dioxide.
Figure 8G:
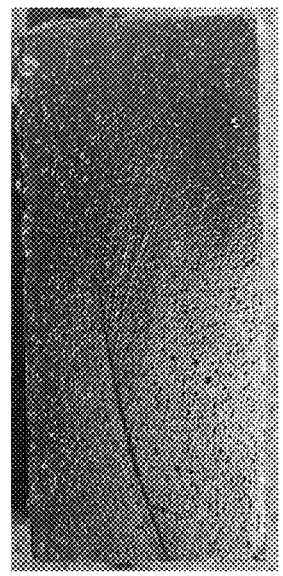
FIG. 8G is a picture of resin modified Portland cement exposed to one week of saturated carbon dioxide.
Figure 8F:
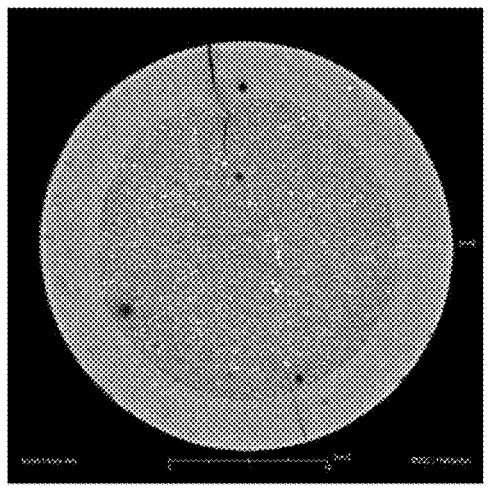
FIG. 8F is a picture of reduced Portland cement exposed to one week of saturated carbon dioxide.
Figure 8H:
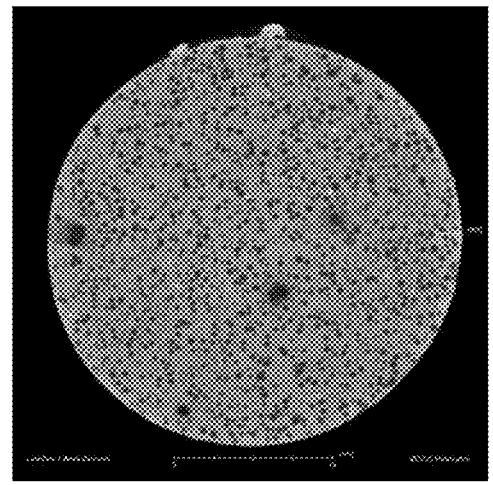
FIG. 8H is a picture of resin modified Portland cement exposed to one week of saturated carbon dioxide.
Figure 9A:
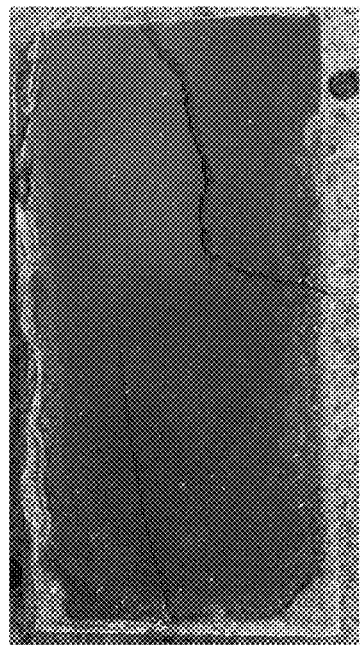
FIG. 9A is a picture of neat cement exposed to one month of saturated carbon dioxide.
Figure 9C:
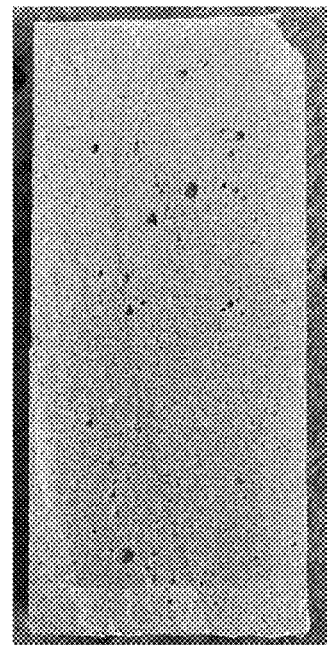
FIG. 9C is a picture of water extended cement exposed to one month of saturated carbon dioxide.
Figure 9B:
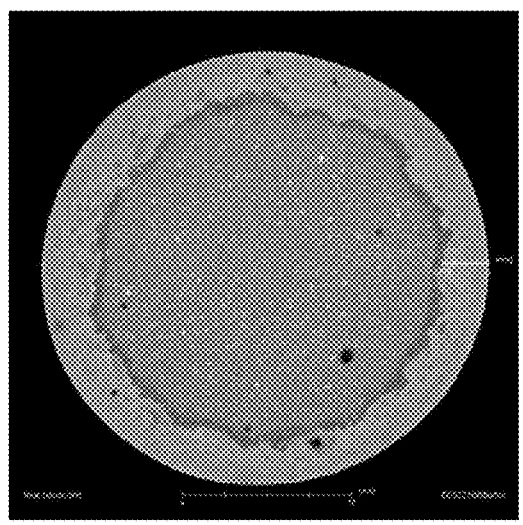
FIG. 9B is a picture of neat cement exposed to one month of saturated carbon dioxide.
Figure 9D:
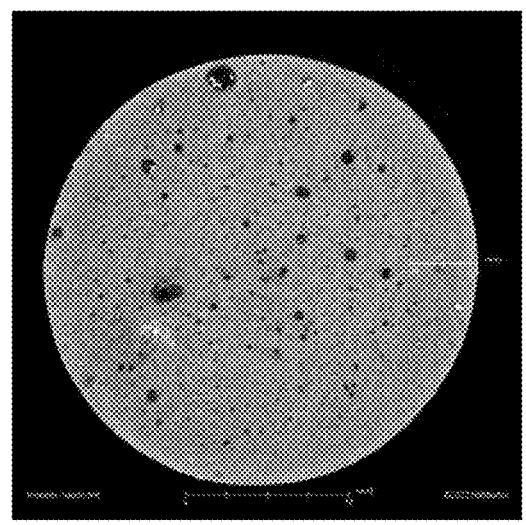
FIG. 9D is a picture of water extended cement exposed to one month of saturated carbon dioxide.
Figure 9E:
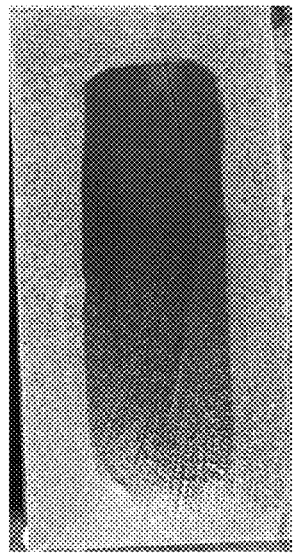
FIG. 9E is a picture of reduced Portland cement exposed to one month of saturated carbon dioxide.
Figure 9G:
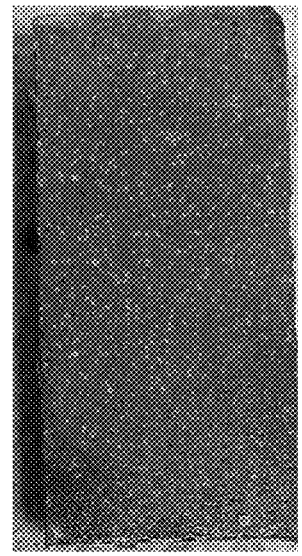
FIG. 9G is a picture of resin modified Portland cement exposed to one month of saturated carbon dioxide.
Figure 9F:
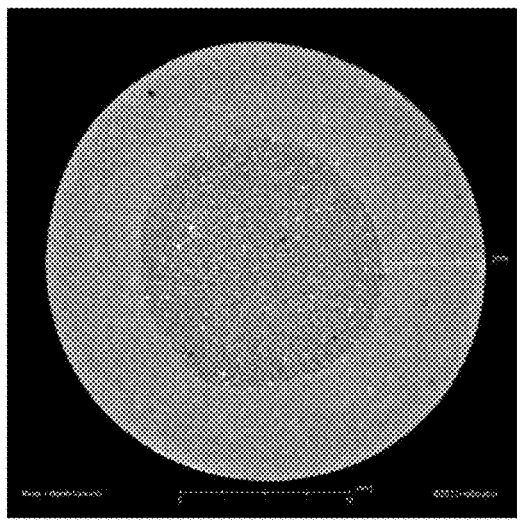
FIG. 9F is a picture of reduced Portland cement exposed to one month of saturated carbon dioxide.
Figure 9H:
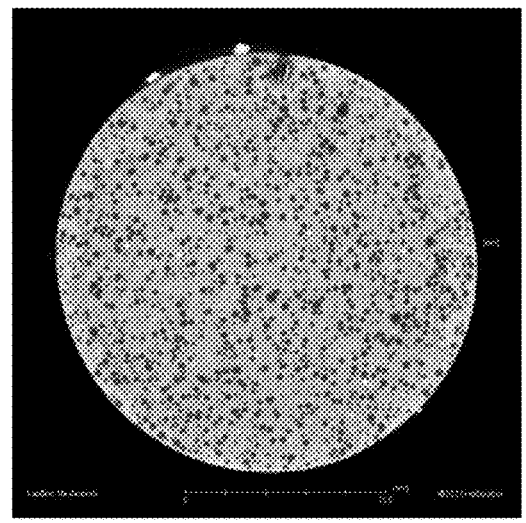
FIG. 9H is a picture of resin modified Portland cement exposed to one month of saturated carbon dioxide.

FIG. 7 illustrates injection of carbon dioxide 706 into a permeable zone 714 of a subterranean formation. A carbon dioxide injection zone 704 is disposed in a CCUS wellbore 700. Surface equipment 702 may be disposed on the surface and may include one or more trucks, pumps, compressors, and/or tanks. Surface equipment 702 may be configured to deliver carbon dioxide 706 to the wellbore 700 through wellhead 724 fluidically coupled to wellbore 700. Carbon dioxide 706 can be a gas, liquid, solid, vapor, a supercritical fluid, or any combinations thereof. The pressure may be sufficient to cause the carbon dioxide 706 to penetrate the carbon dioxide injection zone 704 and permeate the permeable zone 714 of the formation thereabout. The carbon dioxide injection zone 704 may be disposed beneath a caprock 708. The caprock may comprise an impermeable rock overlaid above the permeable zone 714. The carbon dioxide injection zone 704 may be permeable and/or highly porous. The permeable zone 714 and/or carbon dioxide injection zone 704 may form a part of a depleted oil reservoir characterized by high porosity, low pore pressure gradient, high permeability, or as having had a pore pressure reduction. Alternatively, the permeable zone 714 and/or carbon dioxide injection zone 704 may form a part of a salt cavern, or any formation suitable for carbon dioxide injection. A carbonation resistant well barrier 710 is shown to overlap with the caprock zone and with the carbon dioxide injection zone 704. Carbonation resistant well barrier 710 comprises a set cement of the resin containing cement slurry described herein. Alternatively, the carbonation resistant well barrier 710 could overlap with the carbon dioxide injection zone 704 and the shoe of a previous casing or with a liner hanger assembly disposed at any depth within the wellbore 700. Casing 712 is disposed within the wellbore 700. In some embodiments, an optional additional conduit 716 may be disposed within the casing 712. In embodiments including the optional additional conduit 716, carbon dioxide 706 may be injected into the carbon dioxide injection zone 704 via the optional additional conduit 716 by surface equipment 702. A resin modified cement slurry in accordance with this disclosure may also be used to form a carbonation-resistant cement plug within the casing 712 and/or a carbonation-resistant annular sealant without the casing 712 prior to, during, or after injection of carbon dioxide 706 by surface equipment 702. The resin modified cement slurry that may be used to form the carbonation-resistant cement plug may set to form a set cement within the casing 701 to prevent carbon dioxide 706 from escaping the formation and/or to fix the optional additional conduit 716 within the casing 712. In some embodiments, the carbonation-resistant plug may also be used to plug the optional additional conduit 716 or to form a carbonation-resistant cement cap within the optional additional conduit 716. Alternatively, the optional additional conduit 716 may be capped with a removable or non-removable cap to be accessible for future use. Future use may comprise removing the removable cap and injecting carbon dioxide via the wellbore 700. Alternatively, future use may comprise injecting carbon dioxide into the wellbore 700 via the optional additional casing 716. The cap may comprise any material suitable for carbon dioxide storage including but not limited to stainless steel, copper, bronze, brass, galvanized steel, combinations, or alloys thereof for example. The non-removable cap may be operable to fluidically communicate with surface equipment 702 to transmit carbon dioxide into the formation without removal of the cap. Alternatively, the cap may comprise or be attached to an inlet or outlet of an injection wellhead and/or "Christmas tree" shown as wellhead 724. The injection wellhead may serve to fluidically couple the additional conduit or wellhead to one or more sources of carbon dioxide gas. A monitoring system may be electronically coupled to one or more valves and/or sensors disposed within or on the cap to monitor and/or control the flow of the carbon dioxide gas into the formation, such as by electronically regulating one or more valve positions. Injection may be performed at any suitable moment after placement of the optional additional conduit in the wellbore, such as after 1 day, after 1 month, after 1 year, or any other suitable amount of time thereafter. The caprock 708 is shown as being disposed at approximately the same depth as the cement sheath 714, however, the caprock 708 may be disposed at any depth below the cement sheath 714. For example, the caprock could be disposed between the carbon dioxide injection zone 704 and the cement sheath 714 and overlap either, neither, or both the carbon dioxide injection zone 704 and the cement sheath 714. Carbon dioxide 706 may be injected down the wellbore 700 and stored in the permeable zone 714 of the formation at any time after, before, or during introduction of the resin modified cement slurry to the wellbore 700.

The cementing compositions and methods disclosed herein may directly or indirectly affect one or more components or pieces of equipment associated with the preparation, delivery, recapture, recycling, reuse, and/or disposal of the cementing compositions. For example, the cementing compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the cementing compositions. The cementing compositions may also directly or indirectly affect any transport or delivery equipment used to convey the cementing compositions to a well site or downhole such as, for example, any transport vessels, conduits, pipelines, trucks, tubulars, and/or pipes used to compositionally move the cementing compositions from one location to another, any pumps, compressors, or motors (e.g., topside or downhole) used to drive the fracturing fluid into motion, any valves or related joints used to regulate the pressure or flow rate of the cementing compositions, and any sensors (i.e., pressure and temperature), gauges, and/or combinations thereof, and the like. The disclosed cementing compositions may also directly or indirectly affect the various downhole equipment and tools that may come into contact with the cementing compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

The systems and methods for using resin modified cement slurries in CCUS wells may include any of the various features of the systems and methods disclosed herein, including one or more of the following statements.

Statement 1. A method comprising: introducing a resin modified cement slurry into a wellbore penetrating a subterranean formation, the subterranean formation comprising a caprock and a carbon dioxide injection zone, the resin modified cement slurry comprising: a resin; a hardener; a hydraulic cement; and water; and setting the resin modified cement slurry to form a set cement wherein the set cement forms a carbonation-resistant barrier in the carbon dioxide injection zone in the subterranean formation.

Statement 2. The method of statement 1 wherein the carbonation-resistant barrier overlaps with the carbon dioxide injection zone and at least one zone selected from the group consisting of a zone comprising the caprock, a zone containing a shoe of a previous casing, a zone containing a liner hanger assembly, and combinations thereof.

Statement 3. The method of any of statements 1-2 wherein the subterranean formation comprises a depleted reservoir having at least one characteristic selected from the group consisting of pore pressure gradient less than 9 kPa/m, porosity of 5% or greater, permeability of 0.1 mD or greater, and combinations thereof.

Statement 4. The method of any of statements 1-3 wherein the resin comprises at least one resin selected from the group consisting of cyclic olefins, phenol-aldehyde resins, urea-aldehyde resins, urethane resins, phenolic resins, furan resins, furan and furfuryl alcohol resins, latex resins, phenol formaldehyde resins, butoxymethyl butyl glycidyl ether resins, bisphenol A—epichlorohydrin resins, bisphenol F resins, diglycidyl ether bisphenol F resin, cyclohexane dimethanol diglycidyl ether, glycidyl ether resins, polyester resins and hybrids and copolymers thereof, polyurethane resins and hybrids and copolymers thereof, acrylate resins, a cycloalkene, novolak resins, phenolic resins, bisphenol A diglycidyl ether resins, polyamine resins, and combinations thereof.

Statement 5. The method of any of statements 1-4 wherein the hardener comprises at least one hardener selected from the group consisting of aromatic amines, transition metal catalysts, aliphatic tertiary amines, aliphatic amines, cycloaliphatic amines, heterocyclic amines, amido amines, polyamides, polyethyl amines, polyether amines, polyoxyalkylene amines, carboxylic anhydrides, triethylenetetraamine, ethylene diamine, N-cocoalkyltrimethylene, isophorone diamine, N-amino phenyl piperazine, imidazoline, 1,2-diaminocyclohexane, polyether amine, diethyl toluene diamine, 4,4'-diaminodiphenyl methane, methyltetrahydrophthalic anhydride, hexahydrophthalic anhydride, maleic anhydride, polyazelaic polyanhydride, phthalic anhydride, dialkylated phenylenediamines, and combinations thereof.

Statement 6. The method of any of statements 1-5 wherein the resin modified cement slurry is free of bisphenol A diglycidyl ether resin.

Statement 7. The method of any of statements 1-6 wherein the resin comprises a cycloalkene and the hardener comprises a transition metal compound catalyst, wherein the transition metal compound catalyst comprises a catalyst having a structure selected from the group consisting of:

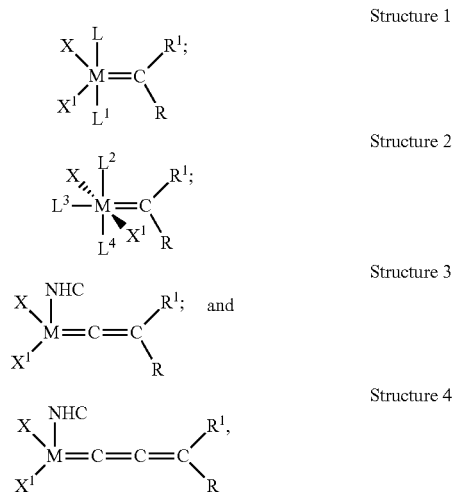

where M is ruthenium or osmium, R and R1 are independently selected from hydrogen, C2-C20 alkenyl, C2-C20 alkynyl, C2-C20 alkyl, aryl, C1-C20 carboxylate, C1-C20 alkoxy, C2-C20 alkenyloxy, C2-C20 alkynyloxy, aryloxy, C2-C20 alkoxycarbonyl, C1-C20 alkylthio, C1-C20 alkylsulfonyl or C1-C20 alkyl sulfinyl, X and X1 are each an anionic ligand, L and L1 are each a neutral electron donor, and NHC is an N-heterocyclic carbene ligand.

Statement 8. The method of statement 7 wherein the cycloalkene is selected from the group consisting of cyclopentadiene, dicyclopentadiene, tricyclopentadiene, cyclobutadiene, cyclobutadiene derivatives, cyclohexadiene, terpinene, norbornadiene, isomers thereof, and combinations thereof.

Statement 9. The method of any of statements 7-8 wherein the resin and the transition metal compound catalyst are present in a mass ratio of about 50:1 to about 10000:1 of the resin to the transition metal compound catalyst Statement 10. The method of any of statements 1-9 wherein the resin and the hardener are present in a combined amount of about 5% to about 50% by volume of the resin modified cement slurry.

Statement 11. The method of any of statements 1-10 wherein the resin is present in the resin modified cement slurry in an amount from about 1% to about 20% by weight of the resin modified cement slurry and wherein the hardener is present in the resin modified cement slurry in an amount from about 0.05% to about 5% by weight of the resin modified cement slurry.

Statement 12. The method of any of statements 1-12 wherein the resin modified cement slurry further comprises at least one supplementary additive selected from the group consisting of supplementary cementitious components, hydraulic binders, micronized solids, inert solid particulates or microparticles, hollow microspheres, low-density elastic beads, weighting agents, lightweight additives, gas-generating additives, mechanical-property-enhancing additives, lost-circulation materials, filtration-control additives, fluid-loss-control additives, defoaming agents, foaming agents, thixotropic additive, dispersants, retarders, accelerators, and combination thereof.

Statement 13. A method comprising: providing a carbon capture underground storage system, wherein the carbon capture underground storage system comprises: a wellbore penetrating a subterranean formation comprising a carbon dioxide injection zone; and a carbonation-resistant barrier, wherein the carbonation-resistant barrier comprises a set cement formed from a resin modified cement slurry comprising a resin, a hardener, a hydraulic cement, and water, and wherein the carbonation-resistant barrier overlaps with at least a portion of the carbon dioxide injection zone in the subterranean formation; introducing carbon dioxide into the carbon capture underground storage system; and flowing the carbon dioxide into the carbon dioxide injection zone.

Statement 14. The method of statement 13, wherein the hardener comprises diethyl toluene diamine, and wherein the hydraulic cement comprises a Portland cement.

Statement 15. The method of any of statements 13-14 wherein the resin comprises a cycloalkene and the hardener comprises a transition metal compound catalyst, wherein the transition metal compound catalyst comprises a catalyst having a structure selected from the group consisting of:

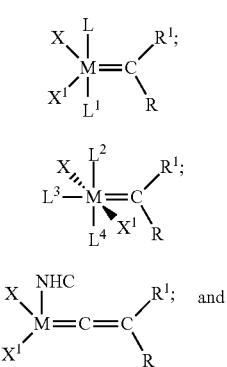

Structure 1

Structure 2

Structure 3

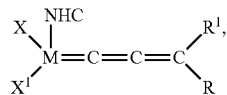

Structure 4 where M is ruthenium or osmium, R and R1 are independently selected from hydrogen, C2-C20 alkenyl, C2-C20 alkynyl, C2-C20 alkyl, aryl, C1-C20 carboxylate, C1-C20 alkoxy, C2-C20 alkenyloxy, C2-C20 alkynyloxy, aryloxy, C2-C20 alkoxycarbonyl, C1-C20 alkylthio, C1-C20 alkylsulfonyl or C1-C20 alkyl sulfinyl, X and X1 are each an anionic ligand, L and L1 are each a neutral electron donor, and NHC is an N-heterocyclic carbene ligand.

Statement 16. The method of any of statements 13-15 wherein the cycloalkene is selected from the group consisting of cyclopentadiene, dicyclopentadiene, tricyclopentadiene, cyclobutadiene, cyclobutadiene derivatives, cyclohexadiene, terpinene, norbornadiene, isomers thereof, and combinations thereof.

Statement 17. The method of any of statements 13-16 wherein the resin and the transition metal compound catalyst are present in a mass ratio of about 50:1 to about 10000:1 of the resin to the transition metal compound catalyst Statement 18. The method of any of statements 13-17 wherein the resin and the hardener are present in a combined amount of about 5% to about 50% by volume of the resin modified cement slurry.

Statement 19. The method of any of statements 13-18 wherein the carbon dioxide injection zone comprises at least one zone selected from the group consisting of a highly porous or permeable formation, a depleted reservoir, a depleted formation, a salt cavern, and combinations thereof.

Statement 20. The method of any of statements 13-19 wherein the carbon dioxide is introduced into the carbon capture underground storage system as a gas, a liquid, a vapor, a supercritical fluid, or a combination thereof.

To facilitate a better understanding of the present invention, the following example of certain aspects of some embodiments are given. In no way should the following examples be read to limit, or define, the entire scope of the disclosure.

Example 1

In this example, the resistance to carbonation of hydraulic cement in combination with resin was tested. Two cement samples were prepared according to Table 1. Sample 1 was prepared with 15% resin by volume to a density of 15.5 lbm/gal and sample 2 was mixed to 16 lbm/gal.

TABLE 1

|  | Sample 1 | Sample 2 |
| --- | --- | --- |
| class H cement | 65.6 wt. % | 69.3 wt. % |
| water | 25.3 wt. % | 30.6 wt. % |
| epoxy resin | 6.9 wt. % | — |
| aromatic amine hardener | 2.0 wt. % | — |
| suspension aid | — | 0.1 wt. % |

The resistance to carbonation was determined by measuring the penetration of a carbonation front into a cement matrix of a set cement using a phenolphthalein test. A fuchsia coloration from phenolphthalein may indicate a basic, acidic, or neutral environment. Samples of each cement prepared according to Table 1 were exposed to $CO_2$ for 1 month in dry supercritical $CO_2$ conditions, for 1 month in wet supercritical $CO_2$ conditions, for 1 month submerged in carbonic acid, and for 1 month with no exposure to $CO_2$. A distinct carbonation front was observed for each sample tested which did not contain resin. It was further observed that the samples which contained resin did not have a distinct carbonation front.

Example 2

In this example cements were prepared and exposed to supercritical $CO_2$ for a period of time. The results are shown in FIGS. 8A-8H for one week and FIGS. 9A-9H for one month after staining with phenolphthalein. It was observed that the resin modified cement had the least amount of carbonation.

Although the present disclosure and its advantages have been described in detail, it should be understood that various changes, substitutions, and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
   providing a carbon capture underground storage system, wherein the carbon capture underground storage system comprises:
   a wellbore penetrating a subterranean formation comprising a carbon dioxide injection zone; and
   a carbonation-resistant barrier, wherein the carbonation-resistant barrier comprises a set cement formed from a resin modified cement slurry comprising a liquid curable resin, a hardener, a hydraulic cement, and water, wherein a combination of the liquid curable resin and the hardener within the resin modified cement slurry impedes carbonation by either a hydrophobicity or an ability to repel water and wherein the carbonation-resistant barrier is resistant to carbonation for a period of one month or greater as measured by a pH indicator solution test,
   wherein the liquid curable resin comprises bisphenol A diglycidyl ether resins wherein the resin is present in an amount of about 21 wt. % to about 60 wt. %;
   wherein the hardener comprises aromatic amines wherein the hardener is present in an amount of about 1 wt. % to about 20 wt. %;
   and wherein the carbonation-resistant barrier overlaps with at least a portion of the carbon dioxide injection zone in the subterranean formation;
   introducing carbon dioxide into the carbon capture underground storage system; and
   flowing the carbon dioxide into the carbon dioxide injection zone.

2. The method of claim 1, wherein the hydraulic cement comprises a Portland cement.

3. The method of claim 1, wherein the resin and the hardener are present in a combined amount of about 5% to about 50% by volume of the resin modified cement slurry.

4. The method of claim 1, wherein the carbon dioxide injection zone comprises at least one zone selected from the group consisting of a porous or permeable formation, a depleted reservoir, a depleted formation, a salt cavern, and combinations thereof.

5. The method of claim 1, wherein the carbon dioxide is introduced into the carbon capture underground storage system as a gas, a liquid, a vapor, a supercritical fluid, or a combination thereof.

6. A method comprising:
   introducing a resin modified cement slurry into a wellbore penetrating a subterranean formation, the subterranean formation comprising a caprock and a carbon dioxide injection zone, the resin modified cement slurry comprising:
   a resin comprising bisphenol A diglycidyl ether resins and wherein the resin is present in an amount of about 21 wt. % to about 60 wt. %;
   a hardener, wherein the hardener comprises aromatic amines thereof and wherein the hardener is present in an amount of about 1 wt. % to about 20 wt. %, wherein a combination of the resin and the hardener within the resin modified cement slurry impedes carbonation by either a hydrophobicity or an ability to repel water;
a hydraulic cement; and
water;
wherein the resin modified cement slurry has a density in a range of about 8 lbm/gal (958 kg/m^3) to about 19 lbm/gal (2277 kg/m^3); and
setting the resin modified cement slurry to form a set cement wherein the set cement forms a carbonation-resistant barrier in the carbon dioxide injection zone in the subterranean formation, wherein the carbonation-resistant barrier is resistant to carbonation for a period of one month or greater as measured by a pH indicator solution test.

7. The method of claim 6, wherein the carbonation-resistant barrier overlaps with the carbon dioxide injection zone and at least one zone selected from the group consisting of a zone comprising the caprock, a zone containing a shoe of a previous casing, a zone containing a liner hanger assembly, and combinations thereof.

8. The method of claim 6, wherein the subterranean formation comprises a depleted reservoir having at least one characteristic selected from the group consisting of pore pressure gradient less than 9 kPa/m, porosity of 5% or greater, permeability of 0.1 mD or greater, and combinations thereof.

9. The method of claim 6, wherein the resin modified cement slurry is free of epoxy phenol novolac resin.

10. The method of claim 6, wherein the resin and the hardener are present in a combined amount of about 5% to about 50% by volume of the resin modified cement slurry.

11. The method of claim 6, wherein the hardener is present in the resin modified cement slurry in an amount from about 1% to about 5% by weight of the resin modified cement slurry.

12. The method of claim 6, wherein the resin modified cement slurry further comprises at least one supplementary additive selected from the group consisting of supplementary cementitious components, hydraulic binders, micronized solids, inert solid particulates or microparticles, hollow microspheres, elastic beads, weighting agents, lightweight additives, gas-generating additives, mechanical-property-enhancing additives, lost-circulation materials, filtration-control additives, fluid-loss-control additives, defoaming agents, foaming agents, thixotropic additive, dispersants, retarders, accelerators, and combination thereof.

13. A method comprising:
introducing a resin modified cement slurry into a wellbore penetrating a subterranean formation, the subterranean formation comprising a caprock and a carbon dioxide injection zone, the resin modified cement slurry comprising:
a resin comprising bisphenol A diglycidyl ether resins wherein the resin is present in an amount of about 21 wt. % to about 60 wt. %;
a hardener, wherein the hardener comprises aromatic amines wherein the hardener is present in an amount of about 1 wt. % to about 20 wt. %, wherein a combination of the resin and the hardener within the resin modified cement slurry impedes carbonation by either a hydrophobicity or an ability to repel water,
a hydraulic cement; and
water in an amount of 33%, about 50% by weight of the resin modified cement slurry, wherein the resin modified cement slurry has a density in a range of about 8 lbm/gal (958 kg/m^3) to about 19 lbm/gal (2277 kg/m^3);
setting the resin modified cement slurry to form a set cement wherein the set cement forms a carbonation-resistant barrier in the carbon dioxide injection zone in the subterranean formation to form a carbon capture underground storage system, wherein the carbonation-resistant barrier is resistant to carbonation for a period of one month or greater as measured by a pH indicator solution test;
introducing carbon dioxide into the carbon capture underground storage system; and
flowing the carbon dioxide into the carbon dioxide injection zone.

14. The method of claim 13, wherein the carbonation-resistant barrier overlaps with the carbon dioxide injection zone and at least one zone selected from the group consisting of a zone comprising the caprock, a zone containing a shoe of a previous casing, a zone containing a liner hanger assembly, and combinations thereof.

15. The method of claim 13, wherein the subterranean formation comprises a depleted reservoir having at least one characteristic selected from the group consisting of pore pressure gradient less than 9 kPa/m, porosity of 5% or greater, permeability of 0.1 mD or greater, and combinations thereof.

16. The method of claim 13, wherein the resin modified cement slurry is free of epoxy phenol novolac resin.

17. The method of claim 13, wherein the resin and the hardener are present in a combined amount of about 5% to about 50% by volume of the resin modified cement slurry.

18. The method of claim 13, wherein the hardener is present in the resin modified cement slurry in an amount from about 1% to about 5% by weight of the resin modified cement slurry.

19. The method of claim 13, wherein the resin modified cement slurry further comprises at least one supplementary additive selected from the group consisting of supplementary cementitious components, hydraulic binders, micronized solids, inert solid particulates or microparticles, hollow microspheres, elastic beads, weighting agents, lightweight additives, gas-generating additives, mechanical-property-enhancing additives, lost-circulation materials, filtration-control additives, fluid-loss-control additives, defoaming agents, foaming agents, thixotropic additive, dispersants, retarders, accelerators, and combination thereof.

20. The method of claim 13, wherein the carbon dioxide injection zone comprises at least one zone selected from the group consisting of a porous or permeable formation, a depleted reservoir, a depleted formation, a salt cavern, and combinations thereof and wherein the carbon dioxide is introduced into the carbon capture underground storage system as a gas, a liquid, a vapor, a supercritical fluid, or a combination thereof.

* * * * *